US011989240B2

(12) United States Patent
Roy et al.

(10) Patent No.: US 11,989,240 B2
(45) Date of Patent: May 21, 2024

(54) NATURAL LANGUAGE PROCESSING MACHINE LEARNING FRAMEWORKS TRAINED USING MULTI-TASK TRAINING ROUTINES

(71) Applicant: Optum Services (Ireland) Limited, Dublin (IE)

(72) Inventors: Suman Roy, Bangalore (IN); Ayan Sengupta, Noida (IN); Michael Bridges, Dublin (IE); Amit Kumar, Gaya (IN)

(73) Assignee: Optum Services (Ireland) Limited, Dublin (IE)

( * ) Notice: Subject to any disclaimer, the term of this patent is extended or adjusted under 35 U.S.C. 154(b) by 13 days.

(21) Appl. No.: 17/808,223

(22) Filed: Jun. 22, 2022

(65) Prior Publication Data

US 2023/0418880 A1 Dec. 28, 2023

(51) Int. Cl.
*G06F 16/00* (2019.01)
*G06F 16/28* (2019.01)
(Continued)

(52) U.S. Cl.
CPC ............ *G06F 16/93* (2019.01); *G06F 16/285* (2019.01); *G06F 16/3344* (2019.01);
(Continued)

(58) Field of Classification Search
CPC ...... G06F 16/93; G06F 16/906; G06F 16/358; G06F 16/355; G06F 16/3344;
(Continued)

(56) References Cited

U.S. PATENT DOCUMENTS 6,301,577 B1 10/2001 Matsumoto et al.
7,203,679 B2 4/2007 Agrawal et al.
(Continued)

FOREIGN PATENT DOCUMENTS

CN 109635109 A 4/2019
CN 108733837 B 4/2021
(Continued)

OTHER PUBLICATIONS

Marciele M. Bittencourt et al., "ML-MDLText: A Multilabel Text Categorization Technique with Incremental Learning", 2019 8th Brazilian Conference on Intelligent Systems (BRACIS) Oct. 2019 (pp. 580-585).*

(Continued)

*Primary Examiner* — Srirama Channavajjala
(74) *Attorney, Agent, or Firm* — Alston & Bird LLP

(57) ABSTRACT

Various embodiments of the present invention provide methods, apparatus, systems, computing devices, computing entities, and/or the like for performing natural language processing operations using an attention-based text encoder machine learning model that is trained using a multi-task training routine that is associated with two or more training tasks (e.g., a multi-task training routine that is associated with two or more sequential training tasks, a multi-training routine that is associated with two or more concurrent training tasks, and/or the like).

9 Claims, 10 Drawing Sheets

(51) Int. Cl.
| | | |
|---|---|---|
| *G06F 16/33* | (2019.01) | |
| *G06F 16/35* | (2019.01) | |
| *G06F 16/583* | (2019.01) | |
| *G06F 16/906* | (2019.01) | |
| *G06F 16/93* | (2019.01) | |
| *G06N 3/044* | (2023.01) | |
| *G06N 3/09* | (2023.01) | |
| *G06N 20/00* | (2019.01) | |
| *G06N 20/20* | (2019.01) | |

(52) U.S. Cl.
CPC ........ *G06F 16/358* (2019.01); *G06F 16/5846* (2019.01); *G06F 16/906* (2019.01); *G06N 3/044* (2023.01); *G06N 3/09* (2023.01); *G06N 20/00* (2019.01); *G06N 20/20* (2019.01)

(58) Field of Classification Search
CPC ... G06F 16/5846; G06F 3/0482; G06N 20/00; G06N 7/01; G06N 5/01; G06N 3/08; G06Q 10/06316
See application file for complete search history.

(56) References Cited

U.S. PATENT DOCUMENTS

| | | | |
|---|---|---|---|
| 7,610,192 B1 | 10/2009 | Jamieson | |
| 7,844,595 B2 | 11/2010 | Canright et al. | |
| 8,402,030 B1 | 3/2013 | Pyle et al. | |
| 8,719,197 B2* | 5/2014 | Schmidtler | G06F 16/93 706/15 |
| 9,087,236 B2 | 7/2015 | Dhoolia et al. | |
| 9,171,057 B2 | 10/2015 | Botros | |
| 10,140,288 B2 | 11/2018 | Pestian et al. | |
| 10,152,648 B2* | 12/2018 | Filimonova | G06V 30/40 |
| 10,296,846 B2 | 5/2019 | Csurka et al. | |
| 10,667,794 B2 | 6/2020 | Beymer et al. | |
| 10,679,738 B2 | 6/2020 | Ganesan et al. | |
| 10,754,925 B2 | 8/2020 | D'Souza et al. | |
| 10,769,381 B2 | 9/2020 | Tacchi et al. | |
| 10,824,661 B1 | 11/2020 | Huang et al. | |
| 11,263,523 B1 | 3/2022 | Duchon et al. | |
| 11,379,665 B1 | 7/2022 | Edmund et al. | |
| 11,481,689 B2* | 10/2022 | Dong | G06F 8/10 |
| 11,734,937 B1* | 8/2023 | Pushkin | G06V 30/10 706/12 |
| 2008/0162455 A1 | 7/2008 | Daga et al. | |
| 2012/0185275 A1 | 7/2012 | Loghmani | |
| 2013/0031088 A1 | 1/2013 | Srikrishna et al. | |
| 2013/0254153 A1 | 9/2013 | Marcheret | |
| 2015/0066974 A1 | 3/2015 | Winn | |
| 2015/0227505 A1 | 8/2015 | Morimoto | |
| 2015/0286629 A1 | 10/2015 | Abdel-Reheem et al. | |
| 2016/0117589 A1 | 4/2016 | Scholtes | |
| 2016/0300020 A1 | 10/2016 | Wetta et al. | |
| 2017/0286869 A1* | 10/2017 | Zarosim | G06N 5/025 |
| 2017/0337334 A1 | 11/2017 | Stanczak et al. | |
| 2018/0165554 A1 | 6/2018 | Zhang et al. | |
| 2018/0349388 A1* | 12/2018 | Skiles | G06F 16/358 |
| 2019/0065986 A1 | 2/2019 | Witbrock et al. | |
| 2019/0108175 A1 | 4/2019 | Sevenster et al. | |
| 2020/0125639 A1* | 4/2020 | Doyle | G06F 40/30 |
| 2020/0134506 A1* | 4/2020 | Wang | G06N 3/088 |
| 2020/0202181 A1 | 6/2020 | Yadav et al. | |
| 2020/0312431 A1 | 10/2020 | Zhang et al. | |
| 2020/0327404 A1 | 10/2020 | Miotto et al. | |
| 2020/0334416 A1 | 10/2020 | Vianu et al. | |
| 2020/0356627 A1 | 11/2020 | Pablo et al. | |
| 2020/0364404 A1 | 11/2020 | Priestas et al. | |
| 2021/0034813 A1 | 2/2021 | Wu et al. | |
| 2021/0149937 A1 | 5/2021 | Coulombe et al. | |
| 2021/0157979 A1 | 5/2021 | Sheide et al. | |
| 2021/0335469 A1 | 10/2021 | Xie et al. | |
| 2021/0343410 A1 | 11/2021 | Zhang et al. | |
| 2021/0358601 A1 | 11/2021 | Pillai et al. | |
| 2022/0019741 A1 | 1/2022 | Roy et al. | |
| 2022/0139384 A1* | 5/2022 | Wu | G06F 40/35 704/257 |
| 2022/0207536 A1 | 6/2022 | Tian et al. | |
| 2022/0318504 A1 | 10/2022 | Malkiel et al. | |
| 2022/0368696 A1 | 11/2022 | Karpovsky et al. | |
| 2022/0414330 A1 | 12/2022 | Roy et al. | |
| 2023/0119402 A1 | 4/2023 | Kumar et al. | |
| 2023/0333518 A1 | 10/2023 | Oi et al. | |
| 2023/0419034 A1 | 12/2023 | Roy et al. | |
| 2023/0419035 A1 | 12/2023 | Roy et al. | |

FOREIGN PATENT DOCUMENTS

| | | |
|---|---|---|
| EP | 3392780 A2 | 10/2018 |
| WO | WO2021252419 A1 * | 12/2021 |
| WO | WO22/081812 A1 * | 4/2022 |

OTHER PUBLICATIONS

Guiying Wei et al., "Study of text classification methods for data sets with huge features", 2010 2nd International Conference on Industrial and Information Systems Jul. 2010, (vol. 1, pp. 433-436).*

Shuo Jiang et al., "Deep Learning for Technical Document Classification", IEEE Transactions on Engineering Management, Mar. 2022, (vol. PP, Issue: 99, pp. 1-17).*

Cover, Thomas M. et al. "Elements of Information Theory," John Wiley & Sons, Inc., (565 pages), (Year: 1991), Print ISBN: 0-471-06259-6, Online ISBN: 0-471-20061-1.

Goldstein, Ira et al. "Three Approaches to Automatic Assignment of ICD-9-CM Codes to Radiology Reports," AMIA Annual Symposium Proceedings Archive, Oct. 11, 2007, pp. 279-283. PMID: 18693842; PMCID: PMC2655861, available online: https://www.ncbi.nlm.nih.gov/pmc/articles/PMC2655861/.

Hager, Gregory E. et al. "Multiple Kernel Tracking With SSD," In Proceedings of the 2004 IEEE Computer Society Conference On Computer Vision and Pattern Recognition, vol. 1, pp. 1-790-1-797, Jun. 27, 2004, (Year: 2004), CVPR 2004, IEEE.

Kailath, Thomas. "The Divergence and Bhattacharyya Distance Measures in Signal Selection," IEEE Transactions On Communication Technology, vol. COM-15, No. 1, Feb. 1967, pp. 52-60.

Kumar, Amit et al. "A Fast Unsupervised Assignment Of ICD Codes With Clinical Notes Through Explanations," SAC '22: Proceedings of the 37th ACM/SIGAPP Symposium on Applied Computing, Apr. 2022, pp. 610-618, available online at. https://doi.org/10.1145/3477314.3506983.

Niblack, W. et al. "QBIC Project: Querying Images By Content, Using Color, Texture, and Shape," In Storage and Retrieval For Image and Video Databases, SPIE vol. 1908, pp. 173-187, Apr. 14, 1993.

Puzicha, Jan et al. "Non-Parametric Similarity Measures For Unsupervised Texture Segmentation and Image Retrieval," In Proceedings / CVPR, IEEE Computer Society Conference On Computer Vision and Pattern Recognition, Jul. 1997, pp. 267-272, DOI: 10.1109/CVPR.1997.609331.

Rubner, Yossi. "Perceptual Metrics For Image Database Navigation," PhD Dissertation, Stanford University, May 1999, (177 pages).

Shuai, Zhao et al. "Comparison Of Different Feature Extraction Methods For Applicable Automated ICD Coding," BMC Medical Informatics and Decision Making, vol. 22, No. 11, pp. 1-15, Dec. 2022, DOI: 10.1186/s12911-022-01753-5.

Singaravelan, Anandakumar et al. "Predicting ICD-9 Codes Using Self-Report Of Patients," Applied Sciences, vol. 11, No. 21:10046, pp. 1-18, Oct. 17, 2021, DOI: 10.3390/app112110046.

Swain, Michael J. et al. "Color Indexing," International Journal of Computer Vision, vol. 7, No. 1, (Year: 1991), pp. 11-32.

Tang, Xiangru et al. "CONFIT: Toward Faithful Dialogue Summarization With Linguistically-Informed Contrastive Fine-Tuning," arXiv: 2112.08713v1 [cs.CL] Dec. 16, 2021, (11 pages), available online at https://arxiv.org/pdf/2112.08713v1.pdf.

(56) References Cited

OTHER PUBLICATIONS

Werman, Michael et al. "A Distance Metric For Multi-Dimensional Histograms," Computer, Vision, Graphics, and Image Processing, vol. 32, pp. 328-336, (Year: 1985), available online at http://w3.cs.huji.ac.il/~peleg/papers/cvgip85-Distance.pdf.
Zhao, Qi et al. "Differential Earth Mover's Distance with Its Applications to Visual Tracking," IEEE Transactions on Pattern Analysis and Machine Intelligence, vol. 32, No. 2, Dec. 31, 2008, pp. 274-287.
NonFinal Office Action for U.S. Appl. No. 16/930,862, dated Dec. 14, 2022, (29 pages), United States Patent and Trademark Office.
Final Office Action for U.S. Appl. No. 16/930,862, dated Jun. 21, 2023, (28 pages), United States Patent and Trademark Office, US.
NonFinal Office Action for U.S. Appl. No. 17/355,731, dated Jun. 6, 2023, (9 pages), United States Patent and Trademark Office, US.
Arumae, Kristjan et al., "CALM: Continuous Adaptive Learning for Language Modeling," arXiv:2004.03794v1 [cs.CL], Apr. 8, 2020, available online at https://arxiv.org/pdf/2004.03794.pdf.
Atutxa, Aitziber et al. "Interpretable Deep Learning To Map Diagnostic Texts To ICD-10 Codes, " International Journal of Medical Informatics, vol. 129, Sep. 2019, pp. 49-59.
Bai, Tian et al. "Improving Medical Code Prediction From Clinical Text Incorporating Online Knowledge Sources," In Proceedings of the 2019 World Wide Web Conference, pp. 72-82, May 13-17, 2019, San Francisco, CA, USA, DOI: 10.1145/3308558.3313485.
Baumel, Ted et al. "Multi-Label Classification Of Patient Notes: Case Study On ICD Code Assignment," In Workshops at the Thirty-Second AAAI Conference On Artificial Intelligence, Jun. 20, 2018, pp. 409-416.
Burgess, Curt et al. "Explorations In Context Space: Words, Sentences, Discourse," Discourse Processes, vol. 25, Nos. 2-3, (1998), pp. 211-257. DOI: 10.1080/01638539809545027.
Chen, Pei-Fu et al. Automatic ICD-10 Coding and Training System: Deep Neural Network Based On Supervised Learning, JMIR Medical Informatics, Aug. 31, 2021, vol. 9, No. 8:e23230, pp. 1-13.
Delvin, Jacob et al. "BERT: Pre-training of Deep Bidirectional Transformers for Language Understanding," NAACL-HLT (1), May 24, 2019, pp. 4171-4186, arXiv: 1810.04805 [cs.CL], available online at https://arxiv.org/abs/1810.04805 (Year: 2019).
Dharmadhikari, Shweta C. et al. "A Novel Multi Label Text Classification Model Using Semi Supervised Learning," International Journal of Data Mining & Knowledge Management Process (IJDKP), vol. 2, No. 4, Jul. 2021, pp. 11-20.
Goldstein, Ira et al. "Three Approaches to Automatic Assignment of ICD-9-CM Codes To Radiology Reports," AMIA Annual Symposium Proceedings Archive, Oct. 11, 2007, pp. 279-283, PMID: 18693842, PMCID: PMC2655861.
Huang, Gao et al. "Supervised Word Mover's Distance," In Advances In Neural Information Processing Systems, (2016), pp. 4862-4870.
Islam, Aminul et al. "Semantic Text Similarity Using Corpus-Based Word Similarity and String Similarity," ACM Transactions on Knowledge Discovery from Data (TKDD), Issue 2, No. 2, Article 10, Jul. 2008, pp. 10:1-10:25.
Kavuluru, Ramakanth et al. "Unsupervised Extraction of Diagnosis Codes from EMRs Using Knowledge-Based and Extractive Text Summarization Techniques," Advanced Artificial Intelligence, vol. 7884, May 2013, pp. 77-88, DOI: 10.1007/978-3-642-38457-8_7, PMCID: PMC5524149, PMID: 28748227.
Kusner, Matt J. et al. "From Word Embeddings to Document Distances," Proceedings of the 32nd International Conference On Machine Learning, vol. 37, (ICML'15), Jun. 1, 2015, pp. 957-966.
Landauer, Thomas K. et al. "An Introduction To Latent Semantic Analysis," Discourse Processes, (1998), vol. 25, pp. 259-284.
Li, Yuhua et al. "Sentence Similarity Based on Semantic Nets and Corpus Statistics," IEEE Transactions On Knowledge and Data Engineering, vol. 18, No. 8, Jun. 26, 2006, pp. 1-35).
Liu, Bing et al. "Text Classification by Labeling Words," American Association for Artificial Intelligence, Jul. 25, 2004, vol. 4, (6 pages).
Mikolov, Tomas et al. "Distributed Representations of Words and Phrases and Their Compositionality," In Advances In Neural Information Processing Systems, (2013) pp. 1-9.
Mullenbach, James et al. "Explainable Prediction of Medical Codes From Clinical Text," arXiv:1802.056952v2 [cs.CL] Apr. 16, 2018, (11 pages).
Nigam, Priyanka. Applying Deep Learning To ICD-9 Multi-Label Classification From Medical Records. Technical Report, Stanford University, (Year: 2016), pp. 1-8, available online: http://cs224d.stanford.edu/reports/priyanka.pdf.
Okazaki, Naoaki et al. "Sentence Extraction By Spreading Activation Through Sentence Similarity," IEICE Transactions Information and Systems, vol. E82, No. 1, Jan. 1999, pp. 1-9.
Patel, Kevin et al. "Adapting Pre-Trained Word Embeddings For Use In Medical Coding," In Biomedical Natural Language Processing Workshop (BioNLP 2017), Aug. 2017, (5 pages).
Saxena, Nihit. "Word Mover's Distance For Text Similarity," Aug. 26, 2019, (8 pages), [Article, Online]. [Retrieved from the Internet Oct. 15, 2020]<URL: https://towardsdatascience.com/word-movers-distance-for-text-similarity-7492aeca71b0>.
Scheurwegs, Elyne et al. "Assigning Clinical Codes With Data Driven Concept Representation On Dutch Clinical Free Text," Journal of Biomedical Informatics, vol. 69, Apr. 8, 2017, pp. 118-127, DOI: 10.1016/j.jbi.2017.04.007.
Sonabend, W. Aaron et al. "Automated ICD Coding Via Unsupervised Knowledge Integration (UNITE)," International Journal of Medical Informatics, vol. 139, Jul. 2020, pp. 104135, ISSN: 1386-5056.
Werner, Matheus et al. "Speeding Up Word Mover's Distance and Its Variants Via Properties Of Distances Between Embeddings," arXiv:1912.005092v2 [cs.CL] May 8, 2020, (8 pages).
Xie, Pengtao et al. "A Neural Architecture for Automated ICD Coding," Proceedings of the 56th Annual Meeting of the Association For Computational Linguistics (Long Papers), vol. 1, Jul. 15-20, 2018, pp. 1066-1076.
Xu, Keyang et al. "Multimodal Machine Learning for Automated ICD Coding," Proceedings of Machine Learning Research, vol. 106, (18 pages), Oct. 28, 2019, PMLR.
Zhang, Minghua et al. "An Unsupervised Model With Attention Autoencoders For Question Retrieval," The Thirty-Second AAAI Conference On Artificial Intelligence (AAAI-18), vol. 32, No. 1, Apr. 26, 2018, pp. 4978-4986.
Zhang, Minghua et al. "Learning Universal Sentence Representations with Mean-Max Attention Autoencoder," arXiv preprint arXiv: 1809.06590v1 [cs.CL], Sep. 18, 2018, (10 pages).
Advisory Action for U.S. Appl. No. 16/930,862, dated Oct. 25, 2023, (3 pages), United States Patent and Trademark Office, US.
NonFinal Office Action for U.S. Appl. No. 16/930,862, dated Dec. 5, 2023, (29 pages), United States Patent and Trademark Office, US.
Notice of Allowance and Fees Due, for U.S. Appl. No. 17/355,731, dated Oct. 31, 2023, (7 pages), United States Patent and Trademark Office, US.
Notice of Allowance and Fees Due (PTOL-85) Mailed on Feb. 28, 2024 for U.S. Appl. No. 17/355,731, 2 page(s).

* cited by examiner

800

Determine an unlabeled word-wise embedded representation for each unlabeled word
801

Determine a label word-wise embedded representation for each label word
802

For each word pair, determine a pairwise word similarity measure
803

For each word pair, determine a pairwise flow indicator
804

Determine cross-document similarity measure based on each pairwise word similarity measure and each pairwise flow indicator
805

FIG. 8

S: I had trouble understanding the gentleman with whom ...  911
       0.8   1.0
         0.9
t:   no knowledge and understanding  912
     (Agent issues: Lack of knowledge)

921
cos_sim = cosine similarity between two word embeddings
cos_sim(no, trouble) = 0.8
cos_sim(knowledge, understanding) = 0.9
cos_sim(understanding, understanding) = 1.0

922
$f_i$ = weight of word $i$ in the list of labeled documents
= $tf\text{-}idf(w_i, C) / \Sigma_j tf\text{-}idf(w_j, C)$ $f_{no} = 0.15$
$f_{knowledge} = 0.5$
$f_{understanding} = 0.35$ 931
Similarity between two sentences = Word Mover Similarity (WMS)
= $\Sigma_{i=1}^{m} \Sigma_{j=1}^{n} t_{ij} * s(i,j)$
= 0.15 * 0.8 + 0.5 * 0.9 + 0.35 * 1.0
= 0.92
≈ 0.9

- "A pedigree of branchio-oto-renal dysplasia (the BOR syndrome) is reported, including the documentation by serial audiometric studies of the onset and rapid progression of hearing loss in the twin sister of an affected child..."

- [27..42] HP_0000110 | renal dysplasia
  [150..167] HP_0003678 | rapid progression
  [171..183] HP_0000365 | hearing loss

FIG. 10

NATURAL LANGUAGE PROCESSING MACHINE LEARNING FRAMEWORKS TRAINED USING MULTI-TASK TRAINING ROUTINES

BACKGROUND

Various embodiments of the present invention address technical challenges related to performing natural language processing and provide solutions to address the efficiency and reliability shortcomings of existing natural language processing solutions.

BRIEF SUMMARY

In general, various embodiments of the present invention provide methods, apparatus, systems, computing devices, computing entities, and/or the like for performing natural language processing operations using an attention-based text encoder machine learning model that is trained using a multi-task training routine that is associated with two or more training tasks (e.g., a multi-task training routine that is associated with two or more sequential training tasks, a multi-training routine that is associated with two or more concurrent training tasks, a multi-task training routine that is associated with two or more sequential training tasks and two or more concurrent training tasks, and/or the like).

In accordance with one aspect, a method is provided. In one embodiment, the method comprises: generating, using an attention-based text encoder machine learning model and based at least in part on the unlabeled document data object, an unlabeled document word-wise embedded representation set for the unlabeled document data object that comprises one or more unlabeled document word-wise embedded representations for one or more unlabeled document words of the unlabeled document data object, wherein: (i) the attention-based text encoder machine learning model is configured to generate, for each input document data object, a respective word-wise embedded representation set that comprises one or more word-wise embedded representations for one or more words of the input document data object and (ii) generating the attention-based text encoder machine learning model comprises: (a) identifying a group of training input document data objects comprising one or more training unlabeled document data objects and a plurality of label document data objects, (b) identifying one or more training document pairs, wherein each training document pair comprises a respective training unlabeled document data object and a respective label document data object that is related to the respective training unlabeled document data object based at least in part on ground-truth cross-document relationships, (c) for each training document pair, generating a cross-document distance measure, (d) generating a concurrent learning loss model based at least in part on: (i) a language modeling loss model that is defined in accordance with a language modeling training task and based at least in part on the group of training input document data objects, and (ii) a similarity determination loss model that is determined based at least in part on each cross-document distance measure, and (e) generating, using the concurrent learning loss model, one or more optimized parameter values for the attention-based text encoder machine learning model; generating, using the attention-based text encoder machine learning model and based at least in part on the label document data object, a label document word-wise embedded representation set for the label document data object that comprises one or more label document word-wise embedded representations for one or more label document words of the label document data object; generating, based at least in part on the one or more unlabeled document word-wise embedded representations and the one or more label document word-wise embedded representations, the cross-document similarity measure; and performing one or more prediction-based actions based at least in part on the cross-document similarity measure.

In accordance with another aspect, an apparatus comprising at least one processor and at least one memory including computer program code is provided. In one embodiment, the at least one memory and the computer program code may be configured to, with the processor, cause the apparatus to: generate, using an attention-based text encoder machine learning model and based at least in part on the unlabeled document data object, an unlabeled document word-wise embedded representation set for the unlabeled document data object that comprises one or more unlabeled document word-wise embedded representations for one or more unlabeled document words of the unlabeled document data object, wherein: (i) the attention-based text encoder machine learning model is configured to generate, for each input document data object, a respective word-wise embedded representation set that comprises one or more word-wise embedded representations for one or more words of the input document data object and (ii) generating the attention-based text encoder machine learning model comprises: (a) identifying a group of training input document data objects comprising one or more training unlabeled document data objects and a plurality of label document data objects, (b) identifying one or more training document pairs, wherein each training document pair comprises a respective training unlabeled document data object and a respective label document data object that is related to the respective training unlabeled document data object based at least in part on ground-truth cross-document relationships, (c) for each training document pair, generating a cross-document distance measure, (d) generating a concurrent learning loss model based at least in part on: (i) a language modeling loss model that is defined in accordance with a language modeling training task and based at least in part on the group of training input document data objects, and (ii) a similarity determination loss model that is determined based at least in part on each cross-document distance measure, and (e) generating, using the concurrent learning loss model, one or more optimized parameter values for the attention-based text encoder machine learning model; generate, using the attention-based text encoder machine learning model and based at least in part on the label document data object, a label document word-wise embedded representation set for the label document data object that comprises one or more label document word-wise embedded representations for one or more label document words of the label document data object; generate, based at least in part on the one or more unlabeled document word-wise embedded representations and the one or more label document word-wise embedded representations, the cross-document similarity measure; and perform one or more prediction-based actions based at least in part on the cross-document similarity measure.

In accordance with yet another aspect, a computer program product is provided. The computer program product may comprise at least one computer-readable storage medium having computer-readable program code portions stored therein, the computer-readable program code portions comprising executable portions configured to: generate, using an attention-based text encoder machine learning model and based at least in part on the unlabeled document data object, an unlabeled document word-wise embedded representation set for the unlabeled document data object that comprises one or more unlabeled document word-wise embedded representations for one or more unlabeled document words of the unlabeled document data object, wherein: (i) the attention-based text encoder machine learning model is configured to generate, for each input document data object, a respective word-wise embedded representation set that comprises one or more word-wise embedded representations for one or more words of the input document data object and (ii) generating the attention-based text encoder machine learning model comprises: (a) identifying a group of training input document data objects comprising one or more training unlabeled document data objects and a plurality of label document data objects, (b) identifying one or more training document pairs, wherein each training document pair comprises a respective training unlabeled document data object and a respective label document data object that is related to the respective training unlabeled document data object based at least in part on ground-truth cross-document relationships, (c) for each training document pair, generating a cross-document distance measure, (d) generating a concurrent learning loss model based at least in part on: (i) a language modeling loss model that is defined in accordance with a language modeling training task and based at least in part on the group of training input document data objects, and (ii) a similarity determination loss model that is determined based at least in part on each cross-document distance measure, and (e) generating, using the concurrent learning loss model, one or more optimized parameter values for the attention-based text encoder machine learning model; generate, using the attention-based text encoder machine learning model and based at least in part on the label document data object, a label document word-wise embedded representation set for the label document data object that comprises one or more label document word-wise embedded representations for one or more label document words of the label document data object; generate, based at least in part on the one or more unlabeled document word-wise embedded representations and the one or more label document word-wise embedded representations, the cross-document similarity measure; and perform one or more prediction-based actions based at least in part on the cross-document similarity measure.

In accordance with one aspect, a method is provided. In one embodiment, the method comprises: generating, using an attention-based text encoder machine learning model and based at least in part on the unlabeled document data object, an unlabeled document word-wise embedded representation set for the unlabeled document data object, wherein: (i) the attention-based text encoder machine learning model is configured to generate, for each input document data object, a respective document-wide embedded representation and a respective word-wise embedded representation set, and (ii) generating the attention-based text encoder machine learning model comprises: (a) identifying a group of training input document data objects comprising one or more training unlabeled document data objects and a plurality of label document data objects, (b) identifying one or more training document pairs, wherein each training document pair comprises a respective training unlabeled document data object and a respective label document data object that is related to the respective training unlabeled document data object based at least in part on ground-truth cross-document relationships, (c) generating, using a language modeling loss model that is defined in accordance with a language modeling training task and based at least in part on the group of training input document data objects, one or more initially-optimized parameter values for one or more trainable parameters of the attention-based text encoder machine learning model, (d) for each training document pair, generating a cross-document distance measure based at least in part on the respective document-wide embedded representation for the respective training unlabeled document data object and the respective label document data object, (e) generating a similarity determination loss model based at least in part on each cross-document distance measure, (f) generating, using a sequential learning loss model that is determined based at least in part on adjusting the similarity determination loss model in accordance with a sequential learning regularization factor that describes computed effects of potential updates to the one or more initially-optimized parameter values on the language modeling loss model, one or more subsequently-optimized parameter values for the one or more trainable parameters of the attention-based text encoder machine learning model; generating, using the attention-based text encoder machine learning model and based at least in part on the label document data object, a label document word-wise embedded representation set for the unlabeled document data object; generating, based at least in part on the unlabeled document word-wise embedded representation set and the label document word-wise embedded representation set, the cross-document similarity measure; and performing one or more prediction-based actions based at least in part on the cross-document similarity measure.

In accordance with another aspect, an apparatus comprising at least one processor and at least one memory including computer program code is provided. In one embodiment, the at least one memory and the computer program code may be configured to, with the processor, cause the apparatus to: generate, using an attention-based text encoder machine learning model and based at least in part on the unlabeled document data object, an unlabeled document word-wise embedded representation set for the unlabeled document data object, wherein: (i) the attention-based text encoder machine learning model is configured to generate, for each input document data object, a respective document-wide embedded representation and a respective word-wise embedded representation set, and (ii) generating the attention-based text encoder machine learning model comprises: (a) identifying a group of training input document data objects comprising one or more training unlabeled document data objects and a plurality of label document data objects, (b) identifying one or more training document pairs, wherein each training document pair comprises a respective training unlabeled document data object and a respective label document data object that is related to the respective training unlabeled document data object based at least in part on ground-truth cross-document relationships, (c) generating, using a language modeling loss model that is defined in accordance with a language modeling training task and based at least in part on the group of training input document data objects, one or more initially-optimized parameter values for one or more trainable parameters of the attention-based text encoder machine learning model, (d) for each training document pair, generating a cross-document distance measure based at least in part on the respective document-wide embedded representation for the respective training unlabeled document data object and the respective label document data object, (e) generating a similarity determination loss model based at least in part on each cross-document distance measure, (f) generating, using a sequential learning loss model that is determined based at least in part on adjusting the similarity determination loss model in accordance with a sequential learning regularization factor that describes computed effects of potential updates to the one or more initially-optimized parameter values on the language modeling loss model, one or more subsequently-optimized parameter values for the one or more trainable parameters of the attention-based text encoder machine learning model; generate, using the attention-based text encoder machine learning model and based at least in part on the label document data object, a label document word-wise embedded representation set for the unlabeled document data object; generate, based at least in part on the unlabeled document word-wise embedded representation set and the label document word-wise embedded representation set, the cross-document similarity measure; and perform one or more prediction-based actions based at least in part on the cross-document similarity measure.

In accordance with yet another aspect, a computer program product is provided. The computer program product may comprise at least one computer-readable storage medium having computer-readable program code portions stored therein, the computer-readable program code portions comprising executable portions configured to: generate, using an attention-based text encoder machine learning model and based at least in part on the unlabeled document data object, an unlabeled document word-wise embedded representation set for the unlabeled document data object, wherein: (i) the attention-based text encoder machine learning model is configured to generate, for each input document data object, a respective document-wide embedded representation and a respective word-wise embedded representation set, and (ii) generating the attention-based text encoder machine learning model comprises: (a) identifying a group of training input document data objects comprising one or more training unlabeled document data objects and a plurality of label document data objects, (b) identifying one or more training document pairs, wherein each training document pair comprises a respective training unlabeled document data object and a respective label document data object that is related to the respective training unlabeled document data object based at least in part on ground-truth cross-document relationships, (c) generating, using a language modeling loss model that is defined in accordance with a language modeling training task and based at least in part on the group of training input document data objects, one or more initially-optimized parameter values for one or more trainable parameters of the attention-based text encoder machine learning model, (d) for each training document pair, generating a cross-document distance measure based at least in part on the respective document-wide embedded representation for the respective training unlabeled document data object and the respective label document data object, (e) generating a similarity determination loss model based at least in part on each cross-document distance measure, (f) generating, using a sequential learning loss model that is determined based at least in part on adjusting the similarity determination loss model in accordance with a sequential learning regularization factor that describes computed effects of potential updates to the one or more initially-optimized parameter values on the language modeling loss model, one or more subsequently-optimized parameter values for the one or more trainable parameters of the attention-based text encoder machine learning model; generate, using the attention-based text encoder machine learning model and based at least in part on the label document data object, a label document word-wise embedded representation set for the unlabeled document data object; generate, based at least in part on the unlabeled document word-wise embedded representation set and the label document word-wise embedded representation set, the cross-document similarity measure; and perform one or more prediction-based actions based at least in part on the cross-document similarity measure.

In accordance with one aspect, a method is provided. In one embodiment, the method comprises: generating, using an attention-based text encoder machine learning model and based at least in part on the unlabeled document data object, an unlabeled document word-wise embedded representation set for the unlabeled document data object, wherein: (i) the attention-based text encoder machine learning model is configured to generate, for each input document data object, a respective word-wise embedded representation set, and (ii) generating the attention-based text encoder machine learning model comprises: (a) identifying one or more training input document data objects each associated with a ground-truth label classification, (b) generating, using a language modeling loss model that is defined in accordance with a language modeling training task and based at least in part on the one or more training input document data objects, one or more initially-optimized parameter values for one or more trainable parameters of the attention-based text encoder machine learning model, (c) for each training input document data object: (1) generating, using the attention-based text encoder machine learning model, the respective word-wise embedded representation set for the training input document data object, and (2) generating, using a document classification machine learning model and based at least in part on the respective word-wise embedded representation set for the training input document data object, an inferred document classification for the training input document data object, and (3) generating, based at least in part on the inferred document classification for the training input document data object and a ground-truth document classification for the training input document data object, a per-document classification loss model for the training input document data object, (d) generating a document classification loss model based at least in part on each per-document classification loss model, and (e) generating, using a sequential learning loss model that is determined based at least in part on adjusting the document classification loss model in accordance with a sequential learning regularization factor that describes computed effects of potential updates to the one or more initially-optimized parameter values on the language modeling loss model, one or more subsequently-optimized parameter values for the attention-based text encoder machine learning model; generating, using the document classification machine learning model and based at least in part on the unlabeled document document-wide embedded representation, the document classification; and performing one or more prediction-based actions based at least in part on the document classification.

In accordance with another aspect, an apparatus comprising at least one processor and at least one memory including computer program code is provided. In one embodiment, the at least one memory and the computer program code may be configured to, with the processor, cause the apparatus to: generate, using an attention-based text encoder machine learning model and based at least in part on the unlabeled document data object, an unlabeled document word-wise embedded representation set for the unlabeled document data object, wherein: (i) the attention-based text encoder machine learning model is configured to generate, for each input document data object, a respective word-wise embedded representation set, and (ii) generating the attenbased text encoder machine learning model comprises: (a) identifying one or more training input document data objects each associated with a ground-truth label classification, (b) generating, using a language modeling loss model that is defined in accordance with a language modeling training task and based at least in part on the one or more training input document data objects, one or more initially-optimized parameter values for one or more trainable parameters of the attention-based text encoder machine learning model, (c) for each training input document data object: (1) generating, using the attention-based text encoder machine learning model, the respective word-wise embedded representation set for the training input document data object, and (2) generating, using a document classification machine learning model and based at least in part on the respective word-wise embedded representation set for the training input document data object, an inferred document classification for the training input document data object, and (3) generating, based at least in part on the inferred document classification for the training input document data object and a ground-truth document classification for the training input document data object, a per-document classification loss model for the training input document data object, (d) generating a document classification loss model based at least in part on each per-document classification loss model, and (e) generating, using a sequential learning loss model that is determined based at least in part on adjusting the document classification loss model in accordance with a sequential learning regularization factor that describes computed effects of potential updates to the one or more initially-optimized parameter values on the language modeling loss model, one or more subsequently-optimized parameter values for the attention-based text encoder machine learning model; generate, using the document classification machine learning model and based at least in part on the unlabeled document document-wide embedded representation, the document classification; and perform one or more prediction-based actions based at least in part on the document classification.

In accordance with yet another aspect, a computer program product is provided. The computer program product may comprise at least one computer-readable storage medium having computer-readable program code portions stored therein, the computer-readable program code portions comprising executable portions configured to: generate, using an attention-based text encoder machine learning model and based at least in part on the unlabeled document data object, an unlabeled document word-wise embedded representation set for the unlabeled document data object, wherein: (i) the attention-based text encoder machine learning model is configured to generate, for each input document data object, a respective word-wise embedded representation set, and (ii) generating the attention-based text encoder machine learning model comprises: (a) identifying one or more training input document data objects each associated with a ground-truth label classification, (b) generating, using a language modeling loss model that is defined in accordance with a language modeling training task and based at least in part on the one or more training input document data objects, one or more initially-optimized parameter values for one or more trainable parameters of the attention-based text encoder machine learning model, (c) for each training input document data object: (1) generating, using the attention-based text encoder machine learning model, the respective word-wise embedded representation set for the training input document data object, and (2) generating, using a document classification machine learning model and based at least in part on the respective word-wise embedded representation set for the training input document data object, an inferred document classification for the training input document data object, and (3) generating, based at least in part on the inferred document classification for the training input document data object and a ground-truth document classification for the training input document data object, a per-document classification loss model for the training input document data object, (d) generating a document classification loss model based at least in part on each per-document classification loss model, and (e) generating, using a sequential learning loss model that is determined based at least in part on adjusting the document classification loss model in accordance with a sequential learning regularization factor that describes computed effects of potential updates to the one or more initially-optimized parameter values on the language modeling loss model, one or more subsequently-optimized parameter values for the attention-based text encoder machine learning model; generate, using the document classification machine learning model and based at least in part on the unlabeled document document-wide embedded representation, the document classification; and perform one or more prediction-based actions based at least in part on the document classification.

BRIEF DESCRIPTION OF THE DRAWINGS

Figure 1:
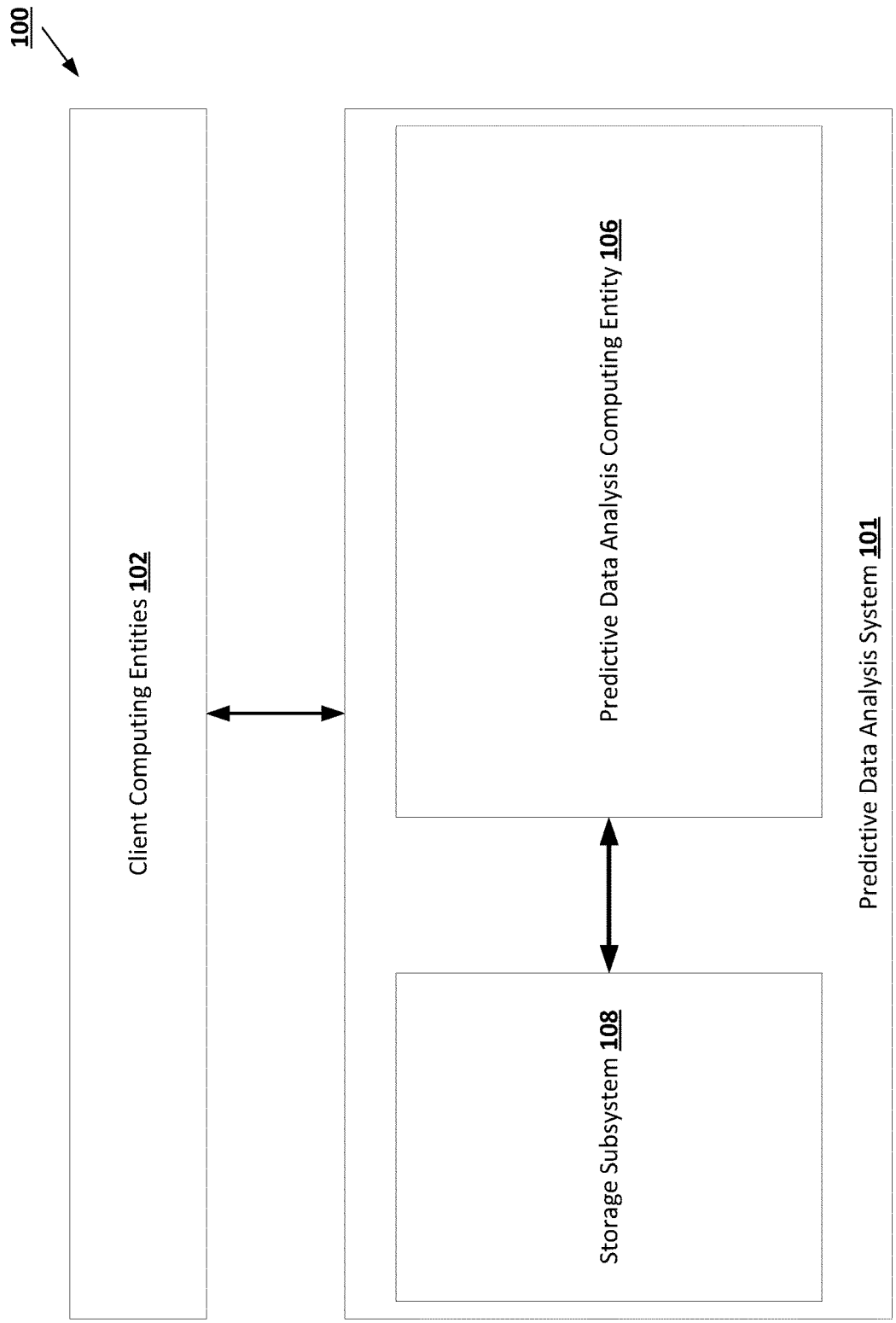

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
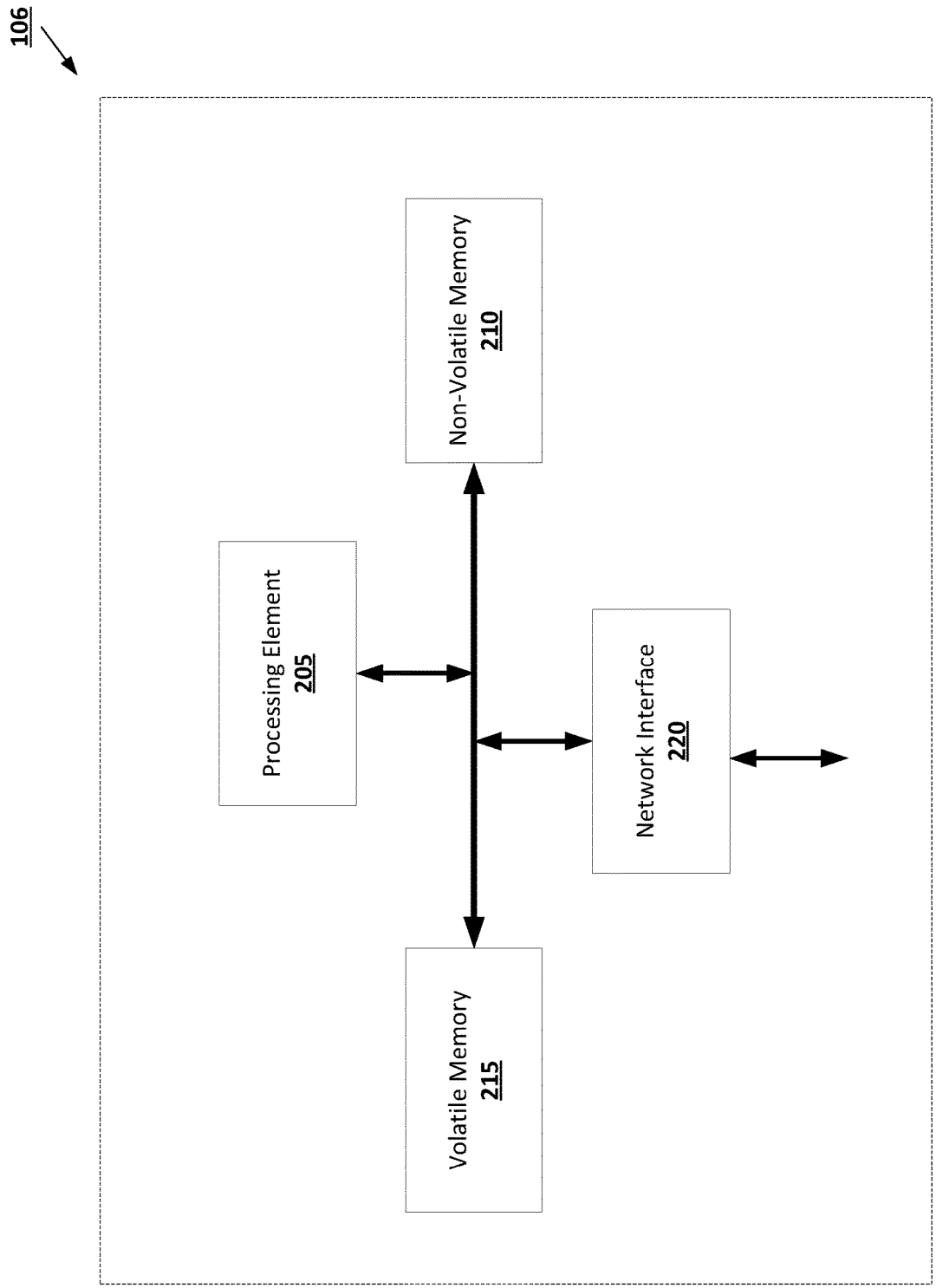

FIG. 2 provides an example predictive data analysis computing entity in accordance with some embodiments discussed herein.

Figure 3:
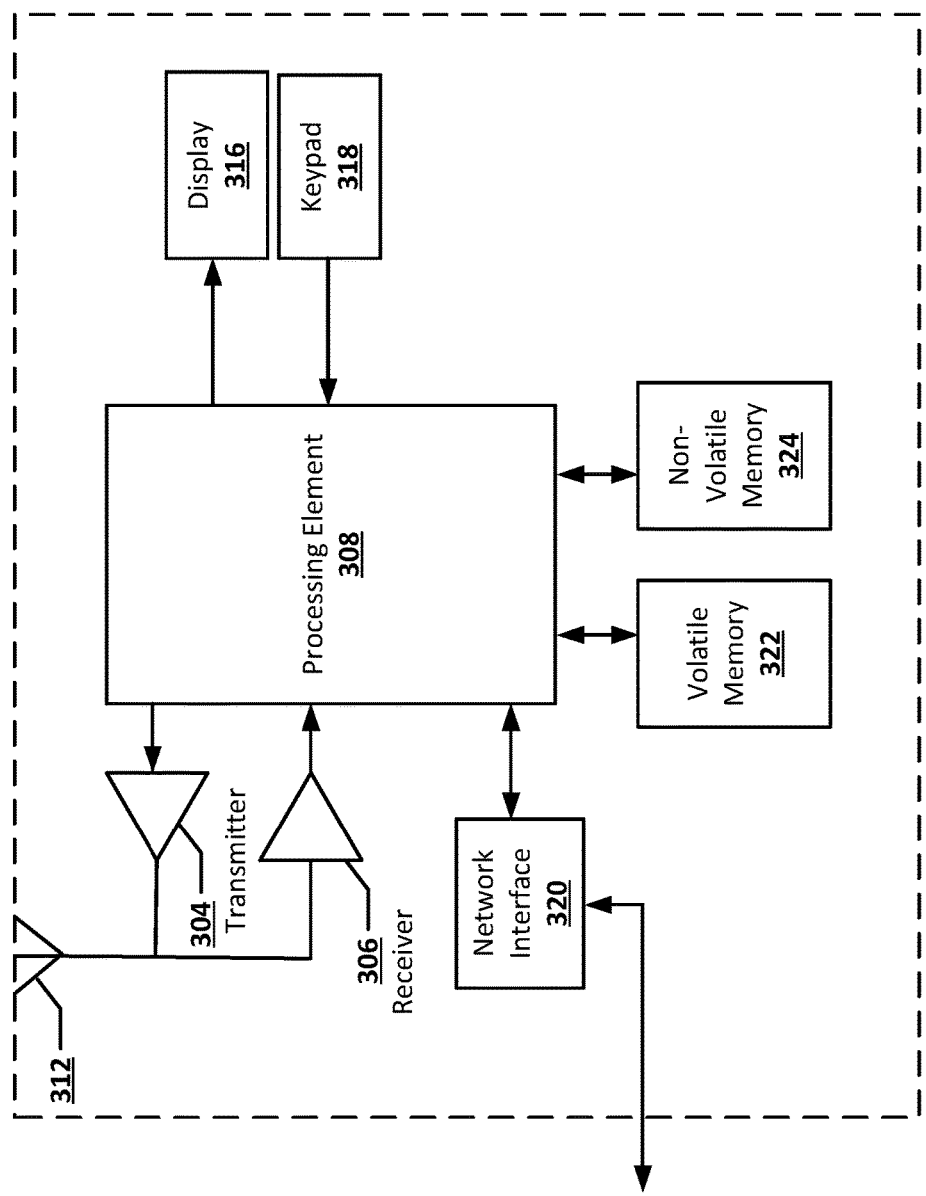

FIG. 3 provides an example client computing entity in accordance with some embodiments discussed herein.

Figure 4:
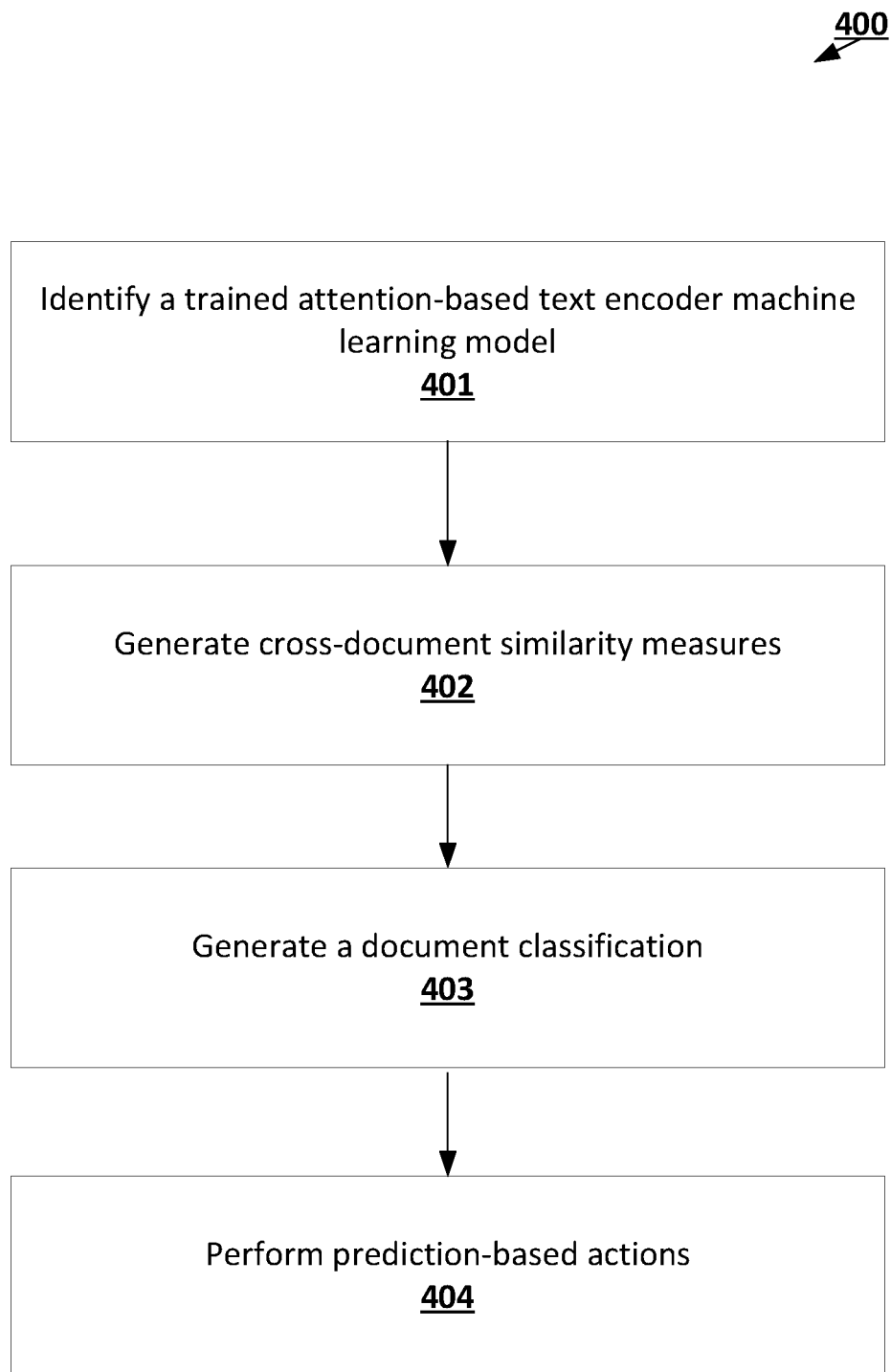

FIG. 4 is a flowchart diagram of an example process for performing one or more natural language processing operations using an attention-based text encoder machine learning model that is trained using a multi-task training routine that is associated with two or more training tasks in accordance with some embodiments discussed herein.

Figure 5:
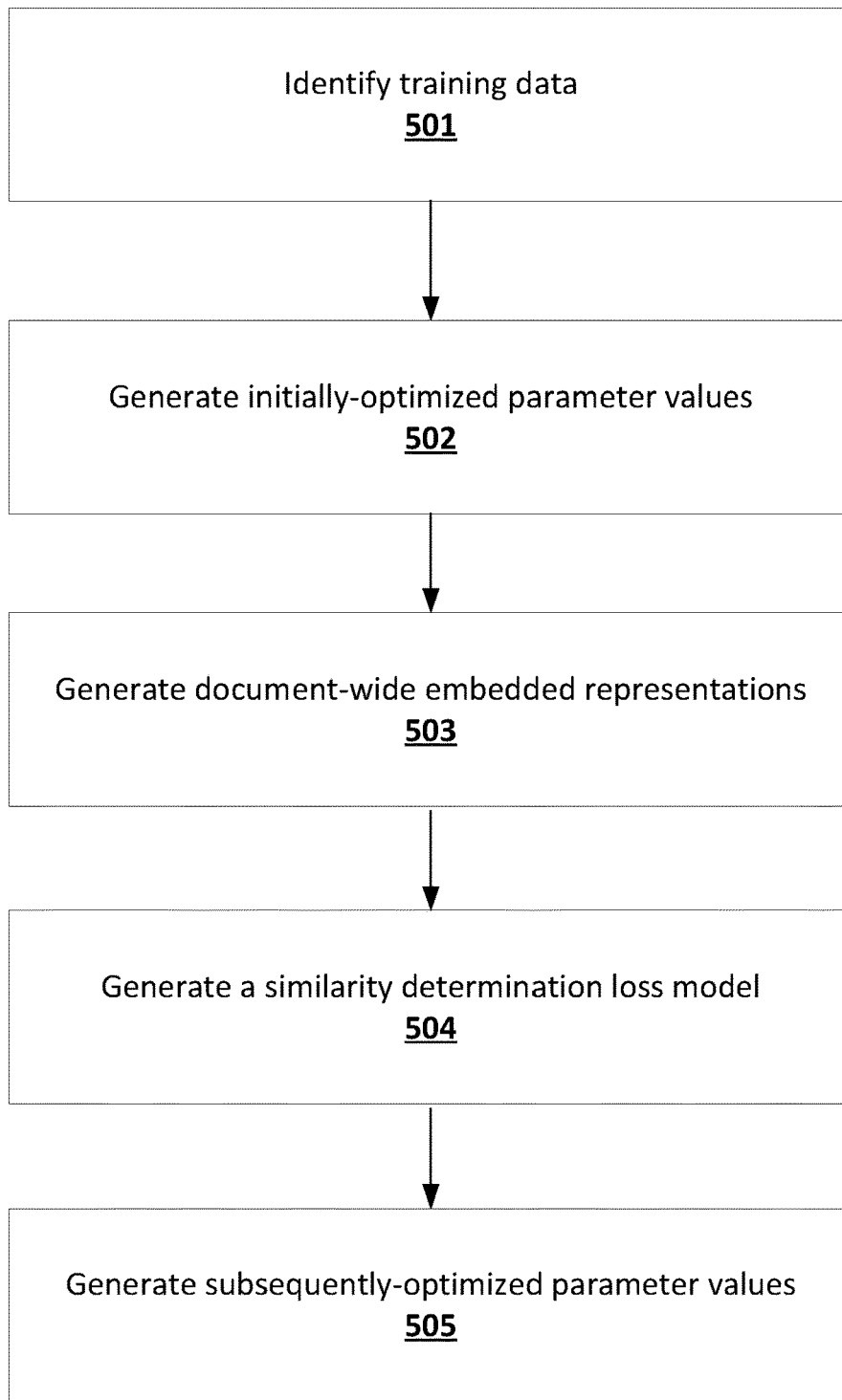

FIG. 5 is a flowchart diagram of an example process for generating an attention-based text encoder machine learning model using a sequential learning loss model associated with a language modeling training task and a similarity determination training task in accordance with some embodiments discussed herein.

Figure 6:
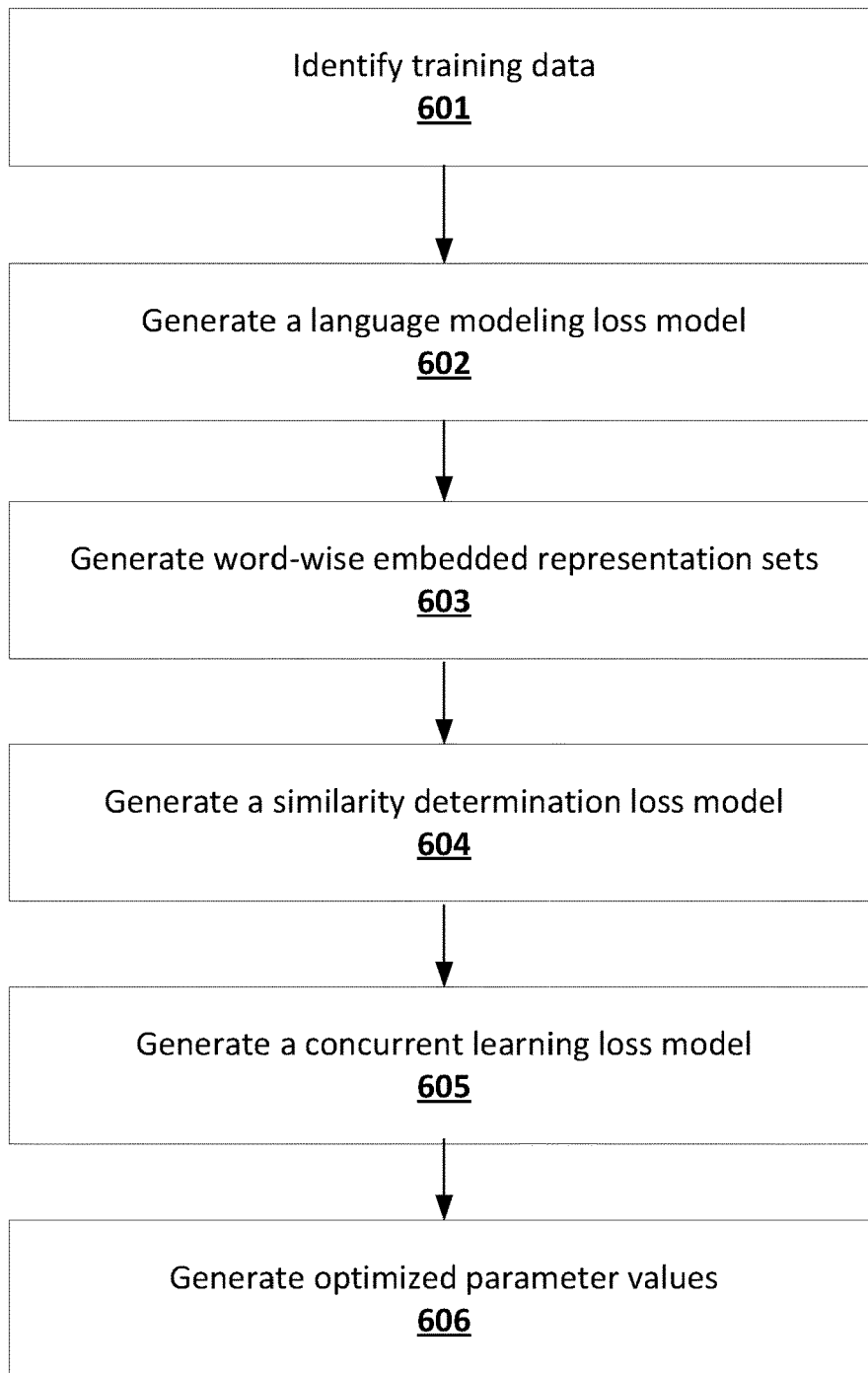

FIG. 6 is a flowchart diagram of an example process for generating an attention-based text encoder machine learning model using a concurrent learning loss model associated with a language modeling training task and a similarity determination training task in accordance with some embodiments discussed herein.

Figure 7:
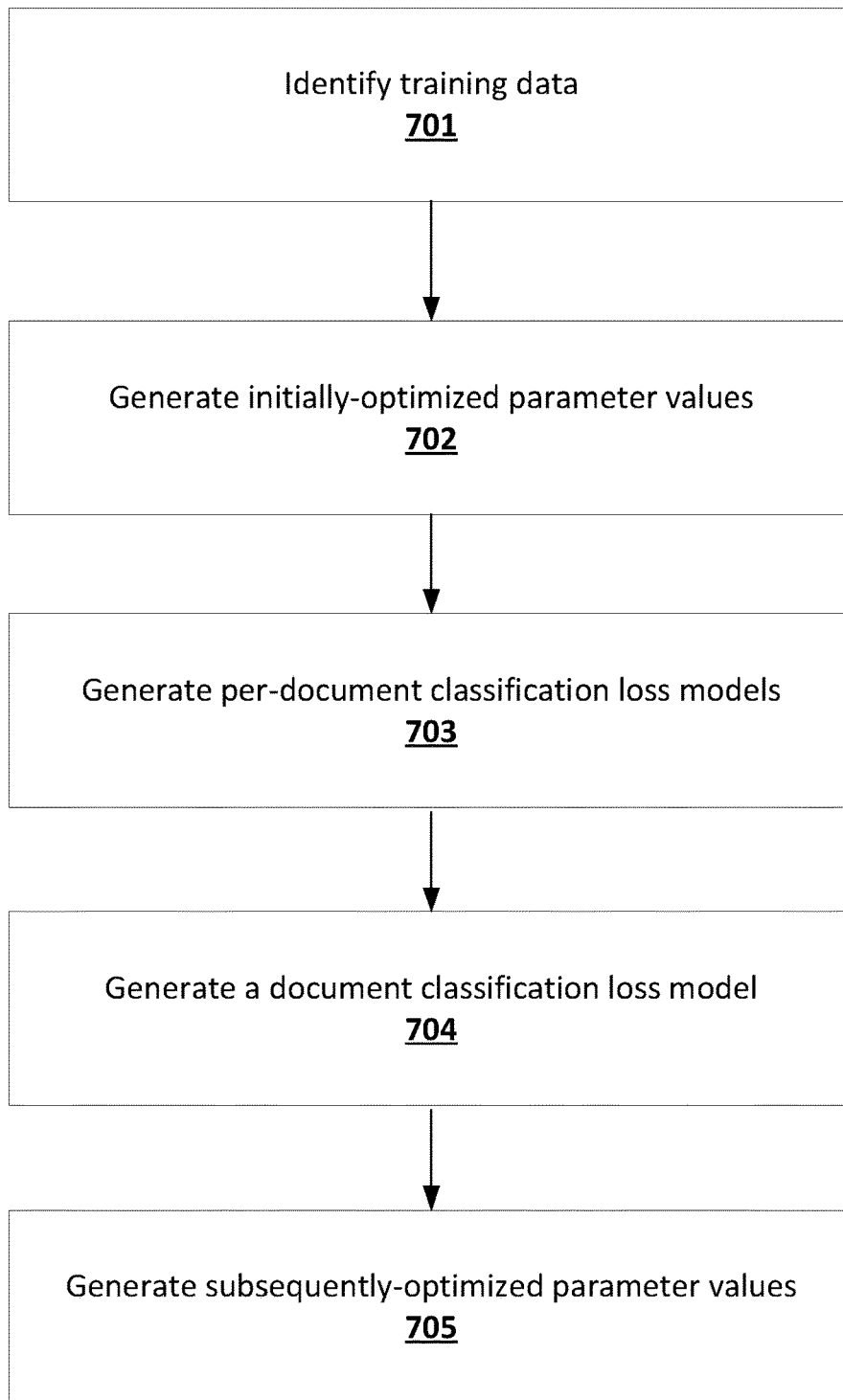

FIG. 7 is a flowchart diagram of an example process for generating an attention-based text encoder machine learning model using a sequential learning loss model associated with a language modeling training task and a document classification training task in accordance with some embodiments discussed herein.

FIG. 8 is a flowchart diagram of an example process for generating a cross-document similarity measure for an unlabeled document data object and a label document data object based at least in part on a word-embedded representation set for the unlabeled document data object and a word-embedded representation set for the label document data object in accordance with some embodiments discussed herein.

FIG. 9 provides an operational example of generating a Word Mover's Similarity measure for a document pair in accordance with some embodiments discussed herein.

FIG. 10 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

As described below, by using various embodiments of the present invention, an attention-based text encoder machine learning model may be trained in accordance with multi-task training routine to generate semantically meaningful embedded representations (e.g., word-wise embedded representations) for input document data objects using different training objectives defined in accordance with different training tasks. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

For example, some embodiments of the present invention sequentially train an attention-based text encoder machine learning model to generate semantically meaningful embedded representations (e.g., word-wise embedded representations) for input document data objects using first training objectives defined in accordance with language modeling tasks and then second training objectives defined in accordance with similarity determinations. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

As another example, some embodiments of the present invention concurrently train an attention-based text encoder machine learning model to generate semantically meaningful embedded representations (e.g., word-wise embedded representations) for input document data objects using first training objectives defined in accordance with language modeling tasks and then training objectives defined in accordance with similarity determinations. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

As a further example, some embodiments of the present invention sequentially train an attention-based text encoder machine learning model to generate semantically meaningful embedded representations (e.g., word-wise embedded representations) for input document data objects using first training objectives defined in accordance with language modeling tasks and then second training objectives defined in accordance with document classifications. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

Moreover, various embodiments of the present invention make important technical contributions to improving resource-usage efficiency of post-prediction systems by using document-wide embedded representations to set the number of allowed computing entities used by the noted post-prediction systems. For example, in some embodiments, a predictive data analysis computing entity determines D document classifications for D document data objects based at least in part on the D document-wide embedded representations for the D document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation:

$$R = \text{ceil}\left(\sum_{k}^{k=K} ur_k\right),$$

where R is the predicted number of computing entities needed to perform post-prediction processing operations with respect to the D document data object, ceil(.) is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

II. Definitions

The term "document data object" may refer to a data construct that describes a collection of one or more words. Examples of document data objects include clinical document data objects (e.g., clinical note document data objects) and medical code description document data objects (e.g., a document data object that describes the textual description for a medical code such as a diagnosis code). In some embodiments, the document data objects comprise a set of unlabeled document data objects and a set of label document data objects, where an objective of one or more natural language processing operations may be to assign a subset of the label document data objects to each unlabeled document data object. For example, one or more natural language processing operations may be configured to assign a related subset of medical code description document data objects (and/or a set of medical codes that correspond to the related subset) to a particular clinical document data object. In an exemplary embodiment, a medical note document data object may be assigned to each diagnosis code whose corresponding diagnosis code description document data object has a threshold-satisfying cross-document similarity measure with respect to the medical note document data object.

The term "attention-based text encoder machine learning model" may refer to a data construct that describes parameters, hyper-parameters, and/or defined operations of a machine learning model that is configured to process an input document data object using an attention mechanism (e.g., a self-attention mechanism, a bidirectional self-attention mechanism, and/or the like) to generate one or more embedded representations of the input document data object. An embedded representation of an input document data object may be a fixed-size numerical representation of at least a portion of the embedded representation. For example, in some embodiments, the attention-based text encoder machine learning model is configured to generate at least one of the following: (i) a document-wide embedded representation of the input document data object that is a fixed-size numerical representation of all of the text data associated with the input document data object, or (ii) for each word of the input document data object, a word-wise embedded representation of the word that is a fixed-size numerical representation of the text data associated with the word. In some embodiments, given an input document data object that comprises n words, the attention-based text encoder machine learning model generates n word-wise embedded representations that may be grouped together in a word-wise embedded representation set for the input document data object. For example, in some embodiments, an attention-based text encoder machine learning model is configured to generate both a document-wide embedded representation of an input document data object and, for each word of the input document data object, a word-wise embedded representation.

The term "cross-document similarity measure" may refer to a data construct that describes a computed/predicted similarity measure between two document data objects, such as a computed/predicted similarity measure between an unlabeled document data object and a label document data object. In some embodiments, the cross-document similarity measure for a document pair comprising a first document data object having $n_1$ words and a second document data object having $n_2$ words may be generated using a technique that uses the $n_1$ word-wise embedded representations associated with the $n_1$ words of the first document data object and the $n_2$ word-wise embedded representations associated with the $n_2$ words of the second document data object to generate the cross-document similarity measure for the document pair. In some embodiments, the cross-document similarity measure for a document pair comprising a first document data object and a second document data object may be generated using a technique that uses the document-wide embedded representation associated with the first document data object and document-wide embedded representation associated with the second document data object to generate the cross-document similarity measure for the document pair. In some embodiments, the cross-document similarity measure for a document pair comprising a first document data object having $n_1$ words and a second document data object having $n_2$ words may be generated using a technique that uses both of the following to generate the cross-document similarity measure for the document pair: (i) the $n_1$ word-wise embedded representations associated with the first document data object and the $n_2$ word-wise embedded representations associated with the second document data object, and (ii) the document-wide embedded representation associated with the first document data object and document-wide embedded representation associated with the second document data object. As described above, the d cross-document similarity measures for an unlabeled document data object with respect to a set of d label document data objects may be used to assign a subset of the d label document data objects to the unlabeled document data object. For example, in some embodiments, given d cross-document similarity measures for an unlabeled document data object with respect to a set of d label document data objects, the unlabeled document data object may be assigned to a subset of the d label document data objects that are associated with the top t cross-document similarity measures for the unlabeled document data object. As another example, in some embodiments, given d cross-document similarity measures for an unlabeled document data object with respect to a set of d label document data objects, the unlabeled document data object may be assigned to a subset of the d label document data objects whose corresponding cross-document similarity measures satisfy (e.g., exceed) a cross-document similarity measure threshold.

The term "document classification machine learning model" may refer to a data construct that describes parameters, hyper-parameters, and/or defined operations of a machine learning model that configured to process one or more embedded representations of an input document data object in order to generate a document classification for the input document data object, such as a rare disease classification for the input document data object. In some embodiments, given an input document data object that is associated with n words, the document classification machine learning model is configured to process n word-wise embedded representations for the input document data object as generated by a trained attention-based text encoder machine learning model to generate the rare disease classification for the input document data object. In some embodiments, given an input document data object that is associated with a document-wide embedded representation as generated by a trained attention-based text encoder machine learning model, the document classification machine learning model is configured to process the document-wide embedded representation to generate the document classification for the input document data object. In some embodiments, given an input document data object that is associated with n words, the document classification machine learning model is configured to process n word-wise embedded representations for the input document data object as generated by a trained attention-based text encoder machine learning model, as well as a document-wide embedded representation for the input document data object as generated by a trained attention-based text encoder machine learning model, to generate the document classification for the input document data object. In some embodiments, the document classification machine learning model comprises one or more feedforward neural network layers, such as one or more fully-connected feed-forward neural network layers.

The term "similarity determination loss model" may refer to a data construct that describes an objective function that relates a distance summation measure determined based at least in part on document-wide embedded representations for training input document data objects to trainable parameters of an attention-based text encoder machine learning model. In some embodiments, because the distance summation measure is determined based at least in part on document-wide embedded representations that are generated by an attention-based text encoder machine learning model, and because the attention-based text encoder machine learning model generates the document-wide embedded representations based at least in part on the trainable parameters of the attention-based text encoder machine learning model, different combinations of the trainable parameter values can lead to different distance summation measures, and thus the distance summation measure can be optimized (e.g., minimized) to at least partially update/train the parameters of the attention-based text encoder machine learning model. In some embodiments, the distance summation measure characterizing the similarity determination loss model is the sum of all cross-document distance measures for all training document pairs, where each training document pair comprises a training unlabeled document data object and a label document data object. For example, if the training data comprises two training unlabeled document data objects $D_1$ and $D_2$, where $D_1$ is related to label document data objects $C_1$ and $C_2$, while $D_2$ is related to label document data objects $C_1$, $C_3$, and $C_5$, then the distance summation measure may be determined based at least in part on the sum of: the cross-document distance measure for $D_1$ and $C_1$, the cross-document distance measure for $D_1$ and $C_2$, the cross-document distance measure for $D_2$ and $C_1$, the cross-document distance measure for $D_2$ and $C_3$, and the cross-document distance measure for $D_2$ and $C_5$. In some embodiments, the similarity determination loss model given a set of T training unlabeled document data objects may be determined based at least in part on the output of the equation $L_{sim} = \Sigma_{t \in T} \Sigma_{c \in \varphi(t)} d(t, c)$, where t is an index variable that iterates over the T training unlabeled document data objects, $\varphi(t)$ is the set of related label document data objects for the tth training unlabeled document data object, c is an index variable that iterates over the set of related label document data objects in $\varphi(t)$, $d(t, c)$ is a cross-document distance measure for the tth training unlabeled document data object and the cth related label document data object, each (t, c) is a training document pair comprising a tth training unlabeled document data object and a cth related label document data object, and $\Sigma_{t \in T} \Sigma_{c \in \varphi(t)} d(t, c)$ is a distance summation measure, as described above.

The term "sequential learning loss model" may refer to a data construct that describes a loss model (i.e., a loss function) that is determined based at least in part on the loss models for training tasks associated with post-initial model training stages of a multi-task training routine. For example, when a multi-task training routine is associated with a first model training stage characterized by a language modeling training task and a second model training stage characterized by a similarity determination training task, the sequential learning loss model for the multi-task training routine may be determined based at least in part on the similarity determination training task. In some embodiments, when a multi-task training routine is associated with a first model training stage characterized by an initial training task and a second model training stage characterized by a subsequent training task, the sequential learning loss model may be determined by adjusting the subsequent loss model associated with the subsequent training task using a sequential learning regularization factor that describes computed effects of potential updates to the initially-optimized parameter values of the attention-based encoder machine learning model on the initial loss model associated with the initial training task. For example, when a multi-task training routine is associated with a first model training stage characterized by a language modeling training task and a second model training stage characterized by a similarity determination training task, the sequential learning loss model may be determined by adjusting the similarity determination loss model associated with the similarity determination training task using a sequential learning regularization factor that describes computed effects of potential updates to the initially-optimized parameter values of the attention-based encoder machine learning model on the language modeling loss model associated with the language modeling training task.

The term "concurrent learning loss model" may refer to a data construct that describes a loss model (i.e., a loss function) that is determined based at least in part on a combination of the loss models for two or more concurrently-performed training tasks. In some embodiments, if the two or more concurrently-performed training tasks include a first training task and a second training task, then the concurrent learning loss model may be generated based at least in part on the output of the equation $L=\mu L_1+(1-\mu)L_2$, where L is the concurrent learning loss model, $L_1$ is the first loss model for the first training task, $L_2$ is the second loss model for the second training task, and $\mu \in (0,1)$ is a hyper-parameter that can be tuned appropriately. For example, if the two or more concurrently-performed training tasks include a language modeling training task and a similarity determination training task, then the concurrent learning loss model may be generated based at least in part on the output of the equation $L=\mu L_{auto}+(1-\mu)L_{sim}$, where L is the concurrent learning loss model, $L_{auto}$ is the language modeling loss model for the language modeling training task, $L_{sim}$ is the similarity determination loss model for the second similarity determination training task, and $\mu \in (0,1)$ is a hyper-parameter that can be tuned appropriately.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a request for generating a diagnosis code for a clinical text.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, by using various embodiments of the present invention, an attention-based text encoder machine learning model may be trained in accordance with multi-task training routine to generate semantically meaningful embedded representations (e.g., word-wise embedded representations) for input document data objects using different training objectives defined in accordance with different training tasks. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

FIG. 4 is a flowchart diagram of an example process 400 for performing one or more natural language processing operations using an attention-based text encoder machine learning model that is trained using a multi-task training routine that is associated with two or more training tasks (e.g., a multi-task training routine that is associated with two or more sequential training tasks, a multi-training routine that is associated with two or more concurrent training tasks, a multi-task training routine that is associated with two or more sequential training tasks and two or more concurrent training tasks, and/or the like). While various embodiments of the present invention describe performing document classification, cross-document similarity determinations, and/or document label assignment using word-wise embedded representations generated using an attention-based text encoder machine learning model that is trained in accordance with the model training techniques described herein, a person of ordinary skill in the relevant technology will recognize that: (i) other natural language processing operations may be performed using word-wise embedded representations that are generated in accordance with the techniques described herein, and (ii) one or more natural language processing operations may be performed using document-wide embedded representations that are generated using an attention-based text encoder machine learning model that is trained in accordance with the model training techniques described herein.

The process 400 begins at step/operation 401 when the predictive data analysis computing entity 106 identifies a trained attention-based text encoder machine learning model. In some embodiments, the trained attention-based text encoder machine learning model is trained by the predictive data analysis computing entity 106 (e.g., by a training engine of the predictive data analysis computing entity 106). In some embodiments, the trained attention-based text encoder machine learning model is trained by a computing entity other than the predictive data analysis computing entity 106 (e.g., a computing entity that may be part of the predictive data analysis system 101, a computing entity that may be remote from the predictive data analysis system 101, and/or the like).

In some embodiments, the attention-based text encoder machine learning model is configured to process an input document data object using an attention mechanism (e.g., a self-attention mechanism, a bidirectional self-attention mechanism, and/or the like) to generate one or more embedded representations of the input document data object. An embedded representation of an input document data object may be a fixed-size numerical representation of at least a portion of the embedded representation. For example, in some embodiments, the attention-based text encoder machine learning model is configured to generate at least one of the following: (i) a document-wide embedded representation of the input document data object that is a fixed-size numerical representation of all of the text data associated with the input document data object, or (ii) for each word of the input document data object, a word-wise embedded representation of the word that is a fixed-size numerical representation of the text data associated with the word. In some embodiments, given an input document data object that comprises n words, the attention-based text encoder machine learning model generates n word-wise embedded representations that may be grouped together in a word-wise embedded representation set for the input document data object.

For example, in some embodiments, an attention-based text encoder machine learning model is configured to generate both a document-wide embedded representation of an input document data object and, for each word of the input document data object, a word-wise embedded representation. An example of such an attention-based text encoder machine learning model is a Bidirectional Encoder Representations from Transformers (BERT) machine learning model, which may generate an embedded representation for each word of an input sequence, as well as an embedded representation for an end-of-sequence token (i.e., the [SEP] token) of the input sequence. In some embodiments, the word-wise embedded representations of an input document data object are determined based at least in part on embedded representations of non-end-of-sequence-tokens tokens of the corresponding input sequence as generated by a BERT machine learning model, while the document-wise embedded representation of the input document data object is determined based at least in part on the end-of-sequence embedded representation of the corresponding input sequence as generated by the BERT machine learning model.

As another example, in some embodiments, an attention-based text encoder machine learning model is configured to only generate, for each word of an input document data object, a word-wise embedded representation. An example of such an attention-based text encoder machine learning model is the attention autoencoder machine learning model that is described in Zhang et al., *An Unsupervised Model with Attention Autoencoders for Question Retrieval*, The Thirty-Second AAAI Conference on Artificial Intelligence (AAAI 2018) 4978-4986, arXiv:1803.03476 [cs.CL], available online at https://arxiv.org/abs/1803.03476 (2018). As described in Zhang, given the input sequence $x=(x_1, x_2, \ldots, x_n)$, where each $x_i$ denotes a word/token of an input sequence, the encoder module of the attention autoencoder machine learning model generates a hidden $h_e=(h_1^e, h_2^e, \ldots, h_n^e)$. In some embodiments, each $h_i^e$ is a word-wise embedded representation of a corresponding word of the input document data object that corresponds to the input sequence, and $h_e$ is the word-wise embedded representation set for the input document data object that corresponds to the input sequence.

In some embodiments, inputs to the attention-based text encoder machine learning model comprise a set of n vectors each describing an input representation (e.g., a one-hot-encoded representation, a tokenized representation, a Word2Vec representation, a Global Vector (Glove) representation, and/or the like) of a word of n words of an input document data object. In some embodiments, outputs of the attention-based text encoder machine learning model comprise m vectors each corresponding to an embedded representation that is generated for all or part of an input document data object (e.g., n word-wise embedded representations with or without a document-wide embedded representation).

In some embodiments, the attention-based text encoder machine learning model is trained using at least one of: (i) two or more sequential training tasks, or (ii) two or more concurrent training tasks. For example, in some embodiments, during a first model training stage, the attention-based text encoder machine learning model is trained using a language modeling training task, while during a second model training stage the attention-based text encoder machine learning model is trained using a similarity determination training task. As another example, in some embodiments, during a first model training stage, the attention-based text encoder machine learning model is trained using a language modeling training task, while during a second model training stage the attention-based text encoder machine learning model is trained using a document classification training task. As yet another example, in some embodiments, during a first model training stage, the attention-based text encoder machine learning model is trained using a language modeling training task, while during a second model training stage the attention-based text encoder machine learning model is trained using a similarity determination task.

In general, given a set of available training tasks (e.g., a set of available training tasks that may comprise one or more language modeling training tasks and one or more non-language-modeling training tasks), any arrangement of the available training tasks using any number of model training stages may be used to train the attention-based text encoder machine learning model. Accordingly, the exemplary embodiments described in Subsections A-C of the present Section IV of the present application should not be viewed as the only available multi-task training routines that are disclosed by the present application. For example, as one exemplary embodiment, a multi-task training routine may comprise the following model training stages: (i) a first model training stage in which an attention-based text encoder machine learning model is trained concurrently using a first language modeling training task and a similarity determination training task, and (ii) a second model training stage in which the attention-based text encoder machine learning model is trained using a document classification training task.

Examples of multi-task training routines are described in Subsections A-C of the present Section IV of the present application. In particular, Subsection A describes a multi-task training routine according to which, during a first model training stage, the attention-based text encoder machine learning model is trained using a language modeling training task, while during a second model training stage the attention-based text encoder machine learning model is trained using a similarity determination training task. Furthermore, Moreover, Subsection C describes a multi-task training routine according to which, during a first model training stage, an attention-based text encoder machine learning model is trained using a language modeling training task, while during a second model training stage the attention-based text encoder machine learning model is trained using a document classification training task. As further described in Subsection C, training an attention-based autoencoder machine learning model using a multi-task training routine that comprises a document classification machine learning model may comprise training a document classification machine learning model that may then be used to perform document classification operations, as described below in relation to step/operation 403.

At step/operation 402, the predictive data analysis computing entity 106 uses the embedded representations generated for an unlabeled document data object and a set of document data objects by the trained attention-based text encoder machine learning model to generate, for each label document data object, a cross-document similarity measure that describes a computed/predicted measure of similarity between the unlabeled document data object and the particular label document data object. In some embodiments, the cross-document similarity measures of an unlabeled document data object are used to assign one or more labels to the unlabeled document data object.

In some embodiments, a document data object may describe a collection of one or more words. Examples of document data objects include clinical document data objects (e.g., clinical note document data objects) and medical code description document data objects (e.g., a document data object that describes the textual description for a medical code such as a diagnosis code). In some embodiments, the document data objects comprise a set of unlabeled document data objects and a set of label document data objects, where an objective of one or more natural language processing operations may be to assign a subset of the label document data objects to each unlabeled document data object. For example, one or more natural language processing operations may be configured to assign a related subset of medical code description document data objects (and/or a set of medical codes that correspond to the related subset) to a particular clinical document data object. In an exemplary embodiment, a medical note document data object may be assigned to each diagnosis code whose corresponding diagnosis code description document data object has a threshold-satisfying cross-document similarity measure with respect to the medical note document data object.

In some embodiments, a cross-document similarity measure describes a computed/predicted similarity measure between two document data objects, such as a computed/predicted similarity measure between an unlabeled document data object and a label document data object. In some embodiments, the cross-document similarity measure for a document pair comprising a first document data object having $n_1$ words and a second document data object having $n_2$ words may be generated using a technique that uses the $n_1$ word-wise embedded representations associated with the $n_1$ words of the first document data object and the $n_2$ word-wise embedded representations associated with the $n_2$ words of the second document data object to generate the cross-document similarity measure for the document pair. In some embodiments, the cross-document similarity measure for a document pair comprising a first document data object and a second document data object may be generated using a technique that uses the document-wide embedded representation associated with the first document data object and document-wide embedded representation associated with the second document data object to generate the cross-document similarity measure for the document pair. In some embodiments, the cross-document similarity measure for a document pair comprising a first document data object having $n_1$ words and a second document data object having $n_2$ words may be generated using a technique that uses both of the following to generate the cross-document similarity measure for the document pair: (i) the $n_1$ word-wise embedded representations associated with the first document data object and the $n_2$ word-wise embedded representations associated with the second document data object, and (ii) the document-wide embedded representation associated with the first document data object and document-wide embedded representation associated with the second document data object.

As described above, the d cross-document similarity measures for an unlabeled document data object with respect to a set of d label document data objects may be used to assign a subset of the d label document data objects to the unlabeled document data object. For example, in some embodiments, given d cross-document similarity measures for an unlabeled document data object with respect to a set of d label document data objects, the unlabeled document data object may be assigned to a subset of the d label document data objects that are associated with the top t cross-document similarity measures for the unlabeled document data object. As another example, in some embodiments, given d cross-document similarity measures for an unlabeled document data object with respect to a set of d label document data objects, the unlabeled document data object may be assigned to a subset of the d label document data objects whose corresponding cross-document similarity measures satisfy (e.g., exceed) a cross-document similarity measure threshold.

As further described above, in some embodiments, the cross-document similarity measure for a document pair comprising a first document data object having $n_1$ words and a second document data object having $n_2$ words may be generated using a technique that uses the $n_1$ word-wise embedded representations associated with the first document data object and the $n_2$ word-wise embedded representations associated with the second document data object to generate the cross-document similarity measure for the document pair. An example of such a technique is the Word Mover's Similarity (WMS) technique that is described in Subsection D of the present Section IV of the present application. However, a person of ordinary skill in the relevant technology will recognize that other techniques may be used to generate a cross-document similarity measure for a document pair given embedded representations of each document data object in the document pair as generated by a trained attention-based text encoder machine learning model. Aspects of WMS techniques are described in U.S. patent application Ser. No. 16/930,862, filed on Jul. 16, 2020 and entitled An Unsupervised Approach To Assignment Of Pre-Defined Labels To Text Documents, which is incorporated by reference herein in its entirety.

For example, in some embodiments, given a first document data object that is associated with a first document-wide embedded representation and a second document data object that is associated with a second document-wide embedded representation, the cross-document similarity measure for the document pair may be generated based at least in part on a distance/similarity measure (e.g., a cosine distance measure, a cosine similarity measure, and/or the like) of the first document-wide embedded representation and the second document wide-embedded representation. Examples of document-wide embedded representations that may be used to generate cross-document similarity measures include document-wide embedded representations generated by a trained attention-based text encoder machine learning model, as well as document-wide embedded representations generated by other text encoder machine learning models (e.g., a Paragraph2Vec-based text encoder machine learning model).

As another example, in some embodiments, given a document pair comprising a first document data object having $n_1$ words and a second document data object having $n_2$ words, the cross-document similarity measure for the document pair may be generated using a statistical distribution measure (e.g., an average) of $n_1*n_2$ distance/similarity measures, where each distance/similarity measure is the distance/similarity measure (e.g., a cosine distance measure, a cosine similarity measure, and/or the like) of a word-wise embedded representation of a word of the $n_1$ words and a word-wise embedded representation of a word of the $n_2$ words. Examples of word-wise embedded representations that may be used to generate cross-document similarity measures include word-wise embedded representations generated by a trained attention-based text encoder machine learning model, as well as word-wise embedded representations generated by other text encoder machine learning models (e.g., a Word2Vec-based text encoder machine learning model).

At step/operation 403, the predictive data analysis computing entity 106 uses the embedded representations generated for an unlabeled document data object by the trained text-based encoder machine learning model to generate a document classification for an unlabeled document data object. The document classification for the unlabeled document data object may be generated by a document classification machine learning model and may, for example, describe a prediction about whether the unlabeled document data object includes clinical data indicative of a rare disease. Accordingly, in some embodiments, the embedded representations generated for an unlabeled document data object by a text-based encoder machine learning model in accordance with multi-task training techniques described herein can be used to perform rare disease prediction for a patient based at least in part on one or more clinical document data objects associated with the patient.

A document classification machine learning model may be configured to process one or more embedded representations of an input document data object in order to generate a document classification for the input document data object, such as a rare disease classification for the input document data object. In some embodiments, given an input document data object that is associated with n words, the document classification machine learning model is configured to process n word-wise embedded representations for the input document data object as generated by a trained attention-based text encoder machine learning model to generate the rare disease classification for the input document data object. In some embodiments, given an input document data object that is associated with a document-wide embedded representation as generated by a trained attention-based text encoder machine learning model, the document classification machine learning model is configured to process the document-wide embedded representation to generate the document classification for the input document data object. In some embodiments, given an input document data object that is associated with n words, the document classification machine learning model is configured to process n word-wise embedded representations for the input document data object as generated by a trained attention-based text encoder machine learning model, as well as a document-wide embedded representation for the input document data object as generated by a trained attention-based text encoder machine learning model, to generate the document classification for the input document data object. In some embodiments, the document classification machine learning model comprises one or more feedforward neural network layers, such as one or more fully-connected feed-forward neural network layers.

In some embodiments, inputs to the document classification machine learning model include one or more vectors each describing at least one embedded representation for an input document data object. For example, inputs to the document classification machine learning model may include a vector corresponding to the word-wise embedded representation set for the input document data object and/or a vector corresponding to the document-wide embedded representation for the input document data object. In some embodiments, outputs of the document classification machine learning model may include a vector that describes, for each defined class of c defined candidate classes (e.g., two defined candidate classes comprising an "affirmative" class corresponding to presence of a rare disease relevance and a "negative" class corresponding to absence of a rare disease relevance), a classification score that describes the computed/predicted likelihood that the input document data object is associated with the respective defined candidate class. In some embodiments, outputs of the document classification machine learning model include a vector and/or an atomic value that describes the document classification for the input document data object (e.g., a document classification that is determined based at least in part on one or more selected candidate classes for the document input data object).

In some embodiments, when the attention-based text encoder machine learning model is trained using a multi-task training routine that comprises at least one document classification training task, the document classification machine learning model is trained by updating parameters of the attention-based text encoder machine learning model to optimize (e.g., minimize) a document classification loss model (i.e., a document classification loss function) that is used to train the attention-based text encoder machine learning model as part of the multi-task training routine.

For example, consider the exemplary embodiment described in Subsection C in which a text-based encoder machine learning model is trained using a multi-task training routine according to which, during a first model training stage, an attention-based text encoder machine learning model is trained using a language modeling training task, while during a second model training stage the attention-based text encoder machine learning model is trained using a document classification training task. As described below, this means that, during the first model training stage, the attention-based text encoder machine learning model is trained by updating values for the trainable parameters of the attention-based text encoder machine learning model to optimize a language modeling loss model (i.e., a language modeling loss function) associated with the language modeling training task and via backpropagating the gradient of the language modeling loss model across the attention-based text encoder machine learning model. In some embodiments, during the second model training stage, the attention-based text encoder machine learning model is trained by updating the trainable parameters of the attention-based text encoder machine learning model to optimize a sequential learning loss model that is determined based at least in part on a document classification loss model (i.e., a document classification loss function) associated with the document classification training task. In some of the noted embodiments, after training the attention-based text encoder machine learning model using this two-stage multi-task model training routine, the trained attention-based text encoder machine learning model is used to generate embedded representations for a training input document data object (e.g., n word-wise embedded representations for n words of the training input document data object) that are then provided to the document classification machine learning model to generate a post-training inferred document classification which is compared to a ground-truth document classification to generate a post-training document classification loss model (i.e., a post-training document classification loss function). In some of the noted embodiments, the classification machine learning model is then trained by backpropagating the post-training document classification loss model across the document classification machine learning model.

At step/operation 404, the predictive data analysis computing entity 106 performs one or more prediction-based actions based at least in part on the cross-document similarity measures generated in step/operation 402, the assignments of subsets of the label document data objects to the unlabeled document data object as generated in step/operation 402, and/or the document classification for the unlabeled document data object as generated in step/operation 403. In some embodiments, performing the one or more prediction-based actions based at least in part on the label assignment for an unlabeled document data object includes displaying the one or more label assignment for an unlabeled document data objects using a prediction output user interface, such as the prediction output user interface 1000 of FIG. 10. As depicted in FIG. 10, the prediction output user interface 1000 displays a list of top diagnosis code labels for an input unlabeled document data object.

In some embodiments, performing the one or more prediction-based actions based at least in part on the label assignment for an unlabeled document data object includes generating a net promoter score (NPS) for the unlabeled document data object that describes an overall customer incident as expressed by the unlabeled document data object. In some embodiments, performing the one or more prediction-based actions based at least in part on the label assignment for an unlabeled document data object includes generating an NPS for a set of unlabeled document data objects, for example for all incident reports associated with an institution and/or for a recent subset of all incident reports associated with an institution.

In some embodiments, performing the one or more prediction-based actions includes performing one or more automated corrective measures and/or one or more automated load balancing operations (e.g., one or more hospital load balancing operations) based at least in part on cross-institution NPSs and/or based at least in part on per-incident-report NPSs. For example, if a cross-institution NPS shows consistent suboptimal service in a particular department, a proposed system may allocate new staff members to the particular department. As another example, if a per-incident-report NPS indicates that a particular staff person associated with the incident report is suffering from network connectivity shortages, a proposed system may allocate a new networking device and/or a new computing device to the staff person.

In some embodiments, performing the prediction-based actions include performing load balancing operations for a post-prediction system. For example, various embodiments of the present invention make important technical contributions to improving resource-usage efficiency of post-prediction systems by using document-wide embedded representations to set the number of allowed computing entities used by the noted post-prediction systems. For example, in some embodiments, a predictive data analysis computing entity determines D document classifications for D document data objects based at least in part on the D document-wide embedded representations for the D document data objects. Then, the count of document data objects that are associated with an affirmative document classification, along with a resource utilization ratio for each document data object, can be used to predict a predicted number of computing entities needed to perform post-prediction processing operations (e.g., automated investigation operations) with respect to the D document data objects. For example, in some embodiments, the number of computing entities needed to perform post-prediction processing operations (e.g., automated investigation operations) with respect to D document data objects can be determined based at least in part on the output of the equation: $R=\text{ceil}(\Sigma_k^{k=K} ur_k)$, where R is the predicted number of computing entities needed to perform post-prediction processing operations with respect to the D document data object, ceil(.) is a ceiling function that returns the closest integer that is greater than or equal to the value provided as the input parameter of the ceiling function, k is an index variable that iterates over K document data objects among the D document data that are associated with affirmative investigative classifications, and $ur_k$ is the estimated resource utilization ratio for a kth document data object that may be determined based at least in part on a count of utterances/tokens/words in the kth document data object. In some embodiments, once R is generated, the predictive data analysis computing entity can use R to perform operational load balancing for a server system that is configured to perform post-prediction processing operations (e.g., automated investigation operations) with respect to D document data objects. This may be done by allocating computing entities to the post-prediction processing operations if the number of currently-allocated computing entities is below R, and deallocating currently-allocated computing entities if the number of currently-allocated computing entities is above R.

A. Sequential Model Training Using Language Modeling and Similarity Determination In some embodiments, an attention-based text encoder machine learning model may be trained in accordance with the process 500 that is depicted in FIG. 5. While various embodiments of the process 500 are described as being performed by the predictive data analysis computing entity 106, a person of ordinary skill in the relevant technology will recognize that the process 500 may be performed by any combination of one or more computing entities.

As depicted in FIG. 5, the process 500 begins at step/operation 501 when the predictive data analysis computing entity 106 identifies (e.g., receives) training data comprising a group of training input document data objects that include one or more training unlabeled document data objects and a plurality of label document data objects. A training unlabeled document data object may be an unlabeled document data object that is associated with a related subset of the label document data objects according to the ground-truth signals described by the training data. For example, the training data may describe that a particular clinical document data object is associated with a set of medical code description document data objects that correspond to a set of ground-truth medical codes for the particular clinical document data object.

At step/operation 502, the predictive data analysis computing entity 106 generates, using a language modeling loss model that is defined in accordance with a language modeling training task and based at least in part on the group of training input document data objects, one or more initially-optimized parameter values for one or more trainable parameters of the attention-based text encoder machine learning model. In some embodiments, step/operation 502 corresponds to a first model training stage in which the attention-based text encoder machine learning model is trained in accordance with a language modeling task, such as a language modeling task that comprises a word masking language modeling sub-task and a next sentence prediction sub-task. In some embodiments, the attention-based encoder machine learning model that is trained using the process 500 is a BERT machine learning model.

In some embodiments, given a set of training input document data objects each corresponding to a document data object, the textual data of the set of training input document data objects is used to generate training data associated with a language modeling task and to use the training data to generate a language modeling loss model. For example, individual words of a training input document data object may be masked to generate masked sequences associated with the training input document data object, and the masked sequences may then be used to predict the masked words. The masked word predictions may then be compared to actual masked words to generate at least one component of a language modeling loss model. As another example, individual sentences of a training document data object may be used to generate predicted next sentences for the individual sentences. The next sentence predictions for individual sentences may then be compared to actual next sentences for the individual sentences to generate at least one component of a language modeling loss model. Exemplary techniques for generating a language modeling loss model for a language modeling task that comprises a word masking language modeling sub-task and a next sentence prediction sub-task are described in Delvin et al., *BERT: Pre-training of Deep Bidirectional Transformers for Language Understanding*, NAACL-HLT (1) 2019: 4171-4186, arXiv:1810.04805 [cs.CL], available online at https://arxiv.org/abs/1810.04805 (2019).

At step/operation 503, after generating the initially-optimized parameter values for the trainable parameters of the attention-based text encoder machine learning model, the predictive data analysis computing entity 106 uses the resulting attention-based text encoder machine learning model to generate, for each training input document data object, a document-wide embedded representation. For example, the predictive data analysis computing entity 106 may process each end-of-sequence embedded representation for an input sequence as generated by a BERT machine learning model to generate the document-wide embedded representation for the training input document data object that is associated with the noted input sequence.

At step/operation 504, the predictive data analysis computing entity 106 determines a similarity determination loss model based at least in part on each document-wide embedded representation that is generated at step/operation 503. In some embodiments, the similarity determination loss model may describe an objective function that relates a distance summation measure determined based at least in part on document-wide embedded representations for training input document data objects to trainable parameters of an attention-based text encoder machine learning model. In some embodiments, because the distance summation measure is determined based at least in part on document-wide embedded representations that are generated by an attention-based text encoder machine learning model, and because the attention-based text encoder machine learning model generates the document-wide embedded representations based at least in part on the trainable parameters of the attention-based text encoder machine learning model, different combinations of the trainable parameter values can lead to different distance summation measures, and thus the distance summation measure can be optimized (e.g., minimized) to at least partially update/train the parameters of the attention-based text encoder machine learning model.

In some embodiments, the distance summation measure characterizing the similarity determination loss model is the sum of all cross-document distance measures for all training document pairs, where each training document pair comprises a training unlabeled document data object and a label document data object. For example, if the training data comprises two training unlabeled document data objects $D_1$ and $D_2$, where $D_1$ is related to label document data objects $C_1$ and $C_2$, while $D_2$ is related to label document data objects $C_1$, $C_3$, and $C_5$, then the distance summation measure may be determined based at least in part on the sum of: the cross-document distance measure for $D_1$ and $C_1$, the cross-document distance measure for $D_1$ and $C_2$, the cross-document distance measure for $D_2$ and $C_1$, the cross-document distance measure for $D_2$ and $C_3$, and the cross-document distance measure for $D_2$ and $C_5$. In some embodiments, the similarity determination loss model given a set of T training unlabeled document data objects may be determined based at least in part on the output of the equation $L_{sim} = \Sigma_{t \in T} \Sigma_{c \in \varphi(t)} d(t, c)$, where t is an index variable that iterates over the T training unlabeled document data objects, $\varphi(t)$ is the set of related label document data objects for the tth training unlabeled document data object, c is an index variable that iterates over the set of related label document data objects in $\varphi(t)$, $d(t, c)$ is a cross-document distance measure for the tth training unlabeled document data object and the cth related label document data object, each (t, c) is a training document pair comprising a tth training unlabeled document data object and a cth related label document data object, and $\Sigma_{t \in T} \Sigma_{c \in \varphi(t)} d(t, c)$ is a distance summation measure, as described above.

In some embodiments, a cross-document distance measure that is used to generate a similarity determination loss model is determined based at least in part on a distance measure of embedded representation(s) of a first document data object that is associated with the cross-document distance measure and embedded representation(s) of a second document data object that is associated with the cross-document distance measure. For example, a cross-document distance measure for a pair of document data objects (e.g., a training document pair comprising a training unlabeled document data object and a related label document data object) describes a distance measure (e.g., a cosine distance) of a document-wide embedded representation of a first document data object associated with the cross-document distance measure and a document-wide embedded representation of a second document data object associated with the cross-document distance measure.

At step/operation 505, the predictive data analysis computing entity 106 generates one or more subsequently-optimized parameter values for the one or more trainable parameters of the attention-based text encoder machine learning model based at least in part on a sequential learning loss model (e.g., a sequential learning loss function) that is determined based at least in part on the similarity determination loss model. In some embodiments, the predictive data analysis computing entity 106 generates the subsequently-optimized parameter values by updating values of the trainable parameters of the attention-based text encoder machine learning model to optimize (e.g., minimize) a sequential learning loss model (e.g., a sequential learning loss function) that is determined based at least in part on the similarity determination loss model.

In some embodiments, a sequential learning loss model may be a loss model (i.e., a loss function) that is determined based at least in part on the loss models for training tasks associated with post-initial model training stages of a multi-task training routine. For example, when a multi-task training routine is associated with a first model training stage characterized by a language modeling training task and a second model training stage characterized by a similarity determination training task, the sequential learning loss model for the multi-task training routine may be determined based at least in part on the similarity determination training task. In some embodiments, when a multi-task training routine is associated with a first model training stage characterized by an initial training task and a second model training stage characterized by a subsequent training task, the sequential learning loss model may be determined by adjusting the subsequent loss model associated with the subsequent training task using a sequential learning regularization factor that describes computed effects of potential updates to the initially-optimized parameter values of the attention-based encoder machine learning model on the initial loss model associated with the initial training task. For example, when a multi-task training routine is associated with a first model training stage characterized by a language modeling training task and a second model training stage characterized by a similarity determination training task, the sequential learning loss model may be determined by adjusting the similarity determination loss model associated with the similarity determination training task using a sequential learning regularization factor that describes computed effects of potential updates to the initially-optimized parameter values of the attention-based encoder machine learning model on the language modeling loss model associated with the language modeling training task.

In some embodiments, adjusting the subsequent loss model associated with the subsequent training task using a sequential learning regularization factor that describes computed effects of potential updates to the initially-optimized parameter values of the attention-based encoder machine learning model on the initial loss model associated with the initial training task comprises performing operations corresponding to one or more continuous adaptive learning techniques that are configured to reduce the performance gap across supervised or unsupervised tasks introduced by task specific models. Exemplary continuous adaptive learning techniques are described in Arumae et al., *CALM: Continuous Adaptive Learning for Language Modeling*, arXiv:2004.03794 [cs.CL], available online at https://arxiv.org/pdf/2004.03794.pdf (2020).

In some embodiments, when a multi-task training routine is associated with a first model training stage characterized by an initial training task and a second model training stage characterized by a subsequent training task, the sequential learning regularization factor is determined based at least in part on, for each trainable parameter: (i) a per-parameter update magnitude measure that is determined based at least in part on the initially-optimized parameter value for the particular trainable parameter and a potential parameter value for the trainable parameter, and (ii) a differentiation measure for the initial loss model associated with the initial training task with respect to the trainable parameter. For example, when a multi-task training routine is associated with a first model training stage characterized by a language modeling training task and a second model training stage characterized by a similarity determination training task, the sequential learning regularization factor may be determined based at least in part on, for each trainable parameter: (i) a per-parameter update magnitude measure that is determined based at least in part on the initially-optimized parameter value for the particular trainable parameter and a potential parameter value for the trainable parameter, and (ii) a differentiation measure for the language modeling loss model with respect to the trainable parameter.

In some embodiments, when a multi-task training routine is associated with a first model training stage characterized by an initial training task and a second model training stage characterized by a subsequent training task, the sequential learning loss model may be determined based at least in part on the output of the equation $L(\theta)=L_B(\theta)+\Sigma_i \lambda F_{i,i}(\theta_i-\theta_i^*)$, where L is the sequential learning loss model, $L_B$ is the subsequent loss model associated with the subsequent training task, $\Sigma_i \lambda F_{i,i}(\theta_i-\theta_i^*)$ is the sequential learning regularization factor, $\theta$ is the set of current parameter values for the set of trainable parameters of the attention-based text encoder machine learning model that are being updated during the second model training stage, $\theta^*$ is the set of initially-optimized parameter values for the set of trainable parameters of the attention-based text encoder machine learning model that resulted from the completion of the first training stage, i is an index variable that iterates over the set of trainable parameters of the attention-based text encoder machine learning model, $\theta_i$ is the current parameter value for the ith trainable parameter of the attention-based text encoder machine learning model that is being updated during the second model training stage, $\theta_i^*$ is the initially-optimized parameter value for the ith trainable parameter of the attention-based text encoder machine learning model that resulted from the completion of the first training stage, $\theta_i-\theta_i$ is the per-parameter update magnitude measure for the ith trainable parameter of the attention-based text encoder machine learning model, $\lambda$ is a predefined regularization coefficient, and F is an adaptive learning measure for the ith trainable parameter of the attention-based text encoder machine learning model that is generated using the equation $$F_{i,i} = \frac{1}{N}\sum_{j=1}^{N} \left(\frac{\partial L_A^{(j)}}{\partial \theta_i}\right)^2.$$

In this equation, j is an index variable that iterates over N training input document data objects, $L_A$ is the initial loss model for the initial training task, $\theta_i$ is the current parameter value for the ith trainable parameter of the attention-based text encoder machine learning model that is being updated during the second model training stage, $L_A^{(j)}$ is the initial loss model with respect to the jth training input document data objects, and $$\frac{\partial L_A^{(j)}}{\partial \theta_i}$$

is the differential measure for the initial loss model with respect to the ith trainable parameter of the attention-based text encoder machine learning model.

For example, when a multi-task training routine is associated with a first model training stage characterized by a language modeling training task and a second model training stage characterized by a similarity determination training task, the sequential learning loss model may be determined based at least in part on the output of the equation $L(\theta)=L_B(\theta)+\Sigma_i \lambda F_{i,i}(\theta_i-\theta_i^*)$, where L is the sequential learning loss model, $L_B$ is the similarity determination loss model associated with the similarity determination training task, $\Sigma_i \lambda F_{i,i}(\theta_i-\theta_i^*)$ is the sequential learning regularization factor, $\theta$ is the set of current parameter values for the set of trainable parameters of the attention-based text encoder machine learning model that are being updated during the second model training stage, $\theta^*$ is the set of initially-optimized parameter values for the set of trainable parameters of the attention-based text encoder machine learning model that resulted from the completion of the first training stage, i is an index variable that iterates over the set of trainable parameters of the attention-based text encoder machine learning model, $\theta_i$ is the current parameter value for the ith trainable parameter of the attention-based text encoder machine learning model that is being updated during the second model training stage, $\theta_i^*$ is the initially-optimized parameter value for the ith trainable parameter of the attention-based text encoder machine learning model that resulted from the completion of the first training stage, $\theta_i-\theta_i^*$ is the per-parameter update magnitude measure for the ith trainable parameter of the attention-based text encoder machine learning, $\lambda$ is a predefined regularization coefficient, and F is an adaptive learning measure for the ith trainable parameter of the attention-based text encoder machine learning model that is generated using the equation $$F_{i,i} = \frac{1}{N}\sum_{j=1}^{N} \left(\frac{\partial L_A^{(j)}}{\partial \theta_i}\right)^2.$$

In this equation, j is an index variable that iterates over N training input document data objects, $L_A$ is the language modeling loss model for the language modeling training task, $\theta_i$ is the current parameter value for the ith trainable parameter of the attention-based text encoder machine learning model that is being updated during the second model training stage, $L_A^{(j)}$ is the language modeling loss model with respect to the jth training input document data objects, and $$\frac{\partial L_A^{(j)}}{\partial \theta_i}$$

is the differential measure for the language modeling loss model with respect to the ith trainable parameter of the attention-based text encoder machine learning model.

Accordingly, by using various embodiments of the present invention, an attention-based text encoder machine learning model may be sequentially trained to generate semantically meaningful embedded representations (e.g., word-wise embedded representations) for input document data objects using first training objectives defined in accordance with language modeling tasks and then second training objectives defined in accordance with similarity determinations. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

B. Concurrent Model Training Using Language Modeling and Similarity Determination In some embodiments, an attention-based text encoder machine learning model may be trained in accordance with the process 600 that is depicted in FIG. 6. While various embodiments of the process 600 are described as being performed by the predictive data analysis computing entity 106, a person of ordinary skill in the relevant technology will recognize that the process 600 may be performed by any combination of one or more computing entities.

As depicted in FIG. 6, the process 600 begins at step/operation 601 when the predictive data analysis computing entity 106 identifies (e.g., receives) training data comprising a group of training input document data objects that include one or more training unlabeled document data objects and a plurality of label document data objects. A training unlabeled document data object may be an unlabeled document data object that is associated with a related subset of the label document data objects according to the ground-truth signals described by the training data. For example, the training data may describe that a particular clinical document data object is associated with a set of medical code description document data objects that correspond to a set of ground-truth medical codes for the particular clinical document data object.

At step/operation 602, the predictive data analysis computing entity 106 generates a language modeling loss model that is defined in accordance with a language modeling training task and based at least in part on the group of training input document data objects. In some embodiments, the language modeling training task comprises a text reconstruction sub-task. In some embodiments, the attention-based text encoder machine learning model that is trained using the process 600 is an attention autoencoder machine learning model.

In some embodiments, given a set of training input document data objects each corresponding to a document data object, the textual data of the set of training input document data objects is used to generate training data associated with a language modeling task and use the training data to generate a language modeling loss model. For example, individual sentences of a training input document data object may be right-shifted, and the right-shifted sentences may be processed by the attention-based text encoder machine learning model to generate a reconstruction of the original sentences. Exemplary techniques for generating a language modeling loss model for a language modeling task that comprises a text reconstruction sub-task are described in Zhang et al., *An Unsupervised Model with Attention Autoencoders for Question Retrieval*, The Thirty-Second AAAI Conference on Artificial Intelligence (AAAI 2018) 4978-4986, arXiv:1803.03476 [cs.CL], available online at https://arxiv.org/abs/1803.03476 (2018).

At step/operation 603, the predictive data analysis computing entity 106 generates, for each training input document data object and based at least in part on the document input data object, a word-wise embedded representation set that comprises n word-wise embedded representations for the n words of the training input data object. For example, the predictive data analysis computing entity 106 may process each training input document data object using an attention autoencoder machine learning model to generate a word-wise embedded representation for each word of the noted training input data object.

At step/operation 604, the predictive data analysis computing entity 106 generates a similarity determination loss model based at least in part on each word-wise embedded representation set that is generated at step/operation 603. In some embodiments, the similarity determination loss model may describe an objective function that relates a distance summation measure determined based at least in part on word-wise embedded representation sets for training input document data objects to trainable parameters of an attention-based text encoder machine learning model. In some embodiments, because the distance summation measure is determined based at least in part on word-wise embedded representation sets that are generated by an attention-based text encoder machine learning model, and because the attention-based text encoder machine learning model generates the word-wise embedded representation sets based at least in part on values for the trainable parameters of the attention-based text encoder machine learning model, different combinations of the trainable parameter values can lead to different distance summation measures, and thus the distance summation measure can be optimized (e.g., minimized) to at least partially update/train the parameters of the attention-based text encoder machine learning model.

In some embodiments, the distance summation measure characterizing the similarity determination loss model is the sum of all cross-document distance measures for all training document pairs, where each training document pair comprises a training unlabeled document data object and a label document data object. For example, if the training data comprises two training unlabeled document data objects $D_1$ and $D_2$, where $D_1$ is related to label document data objects $C_1$ and $C_2$, while $D_2$ is related to label document data objects $C_1$, $C_3$, and $C_5$, then the distance summation measure may be determined based at least in part on the sum of: the cross-document distance measure for $D_1$ and $C_1$, the cross-document distance measure for $D_1$ and $C_2$, the cross-document distance measure for $D_2$ and $C_1$, the cross-document distance measure for $D_2$ and $C_3$, and the cross-document distance measure for $D_2$ and $C_5$. In some embodiments, the similarity determination loss model given a set of T training unlabeled document data objects may be determined based at least in part on the output of the equation $L_{sim} = \Sigma_{t \in T} \Sigma_{c \in \varphi(t)} d(t, c)$, where t is an index variable that iterates over the T training unlabeled document data objects, $\varphi(t)$ is the set of related label document data objects for the tth training unlabeled document data object, c is an index variable that iterates over the set of related label document data objects in $\varphi(t)$, $d(t, c)$ is a cross-document distance measure for the tth training unlabeled document data object and the cth related label document data object, each (t, c) is a training document pair comprising a tth training unlabeled document data object and a cth related label document data object, and $\Sigma_{t \in T} \Sigma_{c \in \varphi(t)} d(t, c)$ is a distance summation measure, as described above.

In some embodiments, a cross-document distance measure that is used to generate a similarity determination loss model is determined based at least in part on a distance measure of embedded representation(s) of a first document data object that is associated with the cross-document distance measure and embedded representation(s) of a second document data object that is associated with the cross-document distance measure. For example, a cross-document distance measure for a pair of document data objects (e.g., a training document pair comprising a training unlabeled document data object and a related label document data object) describes a distance measure (e.g., a cosine distance) of a word-wise embedded representation set of a first document data object associated with the cross-document distance measure and a word-wise embedded representation set of a second document data object associated with the cross-document distance measure. As another example, in some embodiments, given a document pair comprising a first document data object having $n_1$ words and a second document data object having $n_2$ words, the cross-document distance measure for the document pair may be generated using a statistical distribution measure (e.g., an average) of $n_1 * n_2$ distance measures, where each distance measure is the distance measure (e.g., a cosine distance measure, a cosine similarity measure, and/or the like) of a word-wise embedded representation of a word of the $n_1$ words and a word-wise embedded representation of a word of the $n_2$ words. Examples of word-wise embedded representations that may be used to generate cross-document similarity measures include word-wise embedded representations generated by an attention-based text encoder machine learning model, as well as word-wise embedded representations generated by other text encoder machine learning models (e.g., a Word2Vec-based text encoder machine learning model).

At step/operation 605, the predictive data analysis computing entity 106 generates a concurrent learning loss model based at least in part on the language modeling loss model and the similarity determination loss model. In some embodiments, the predictive data analysis computing entity 106 generates the concurrent learning loss model based at least in part on a weighted combination of the language modeling loss model and the similarity determination loss model.

In general, a concurrent learning loss model may be a loss model (i.e., a loss function) that is determined based at least in part on a combination of the loss models for two or more concurrently-performed training tasks. In some embodiments, if the two or more concurrently-performed training tasks include a first training task and a second training task, then the concurrent learning loss model may be generated based at least in part on the output of the equation $L = \mu L_1 + (1-\mu) L_2$, where L is the concurrent learning loss model, $L_1$ is the first loss model for the first training task, $L_2$ is the second loss model for the second training task, and $\mu \in (0,1)$ is a hyper-parameter that can be tuned appropriately. For example, if the two or more concurrently-performed training tasks include a language modeling training task and a similarity determination training task, then the concurrent learning loss model may be generated based at least in part on the output of the equation $L = \mu L_{auto} + (1-\mu) L_{sim}$, where L is the concurrent learning loss model, $L_{auto}$ is the language modeling loss model for the language modeling training task, $L_{sim}$ is the similarity determination loss model for the second similarity determination training task, and $\mu \in (0,1)$ is a hyper-parameter that can be tuned appropriately.

At step/operation 606, the predictive data analysis computing entity 106 generates one or more optimized parameter values for the one or more trainable parameters of the attention-based text encoder machine learning model based at least in part on the concurrent learning loss model. In some embodiments, the predictive data analysis computing entity 106 generates the optimized parameter values by updating values of the trainable parameters of the attention-based text encoder machine learning model to optimize (e.g., minimize) the concurrent loss model.

Accordingly, by using various embodiments of the present invention, an attention-based text encoder machine learning model may be concurrently trained to generate semantically meaningful embedded representations (e.g., word-wise embedded representations) for input document data objects using first training objectives defined in accordance with language modeling tasks and then training objectives defined in accordance with similarity determinations. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

C. Sequential Model Training Using Language Modeling and Document Classification In some embodiments, an attention-based text encoder machine learning model may be trained in accordance with the process 700 that is depicted in FIG. 7. While various embodiments of the process 700 are described as being performed by the predictive data analysis computing entity 106, a person of ordinary skill in the relevant technology will recognize that the process 700 may be performed by any combination of one or more computing entities.

As depicted in FIG. 7, the process 700 begins at step/operation 701 when the predictive data analysis computing entity 106 identifies (e.g., receives) training data comprising a group of training input document data objects (e.g., a group of clinical document data objects each associated with a rare disease relevance label). Each training input document data object may be associated with a ground-truth classification that describes a recorded/observed set of classes associated with the training input document data object, such as a ground-truth classification that describes that a training input document data object recorded/observed to be related to a rare disease or recorded/observed to be unrelated to with a rare disease.

At step/operation 702, the predictive data analysis computing entity 106 generates, using a language modeling loss model that is defined in accordance with a language modeling training task and based at least in part on the group of training input document data objects, one or more initially-optimized parameter values for one or more trainable parameters of the attention-based text encoder machine learning model. In some embodiments, step/operation 702 corresponds to a first model training stage in which the attention-based text encoder machine learning model is trained in accordance with a language modeling task, such as a language modeling task that comprises a word masking language modeling sub-task and a next sentence prediction sub-task. In some embodiments, the attention-based encoder machine learning model that is trained using the process 700 is a BERT machine learning model.

In some embodiments, given a set of training input document data objects each corresponding to a document data object, the textual data of the set of training input document data objects is used to generate training data associated with a language modeling task and use the training data to generate a language modeling loss model. For example, individual words of a training input document data object may be masked to generate masked sequences associated with the training input document data object, and the masked sequences may then be used to predict the masked words. The masked word predictions may then be compared to actual masked words to generate at least one component of a language modeling loss model. As another example, individual sentences of a training document data object may be used to generate predicted next sentences for the individual sentences. The next sentence predictions for individual sentences may then be compared to actual next sentences for the individual sentences to generate at least one component of a language modeling loss model. Exemplary techniques for generating a language modeling loss model for a language modeling task that comprises a word masking language modeling sub-task and a next sentence prediction sub-task are described in Delvin et al., *BERT: Pre-training of Deep Bidirectional Transformers for Language Understanding*, NAACL-HLT (1) 2019: 4171-4186, arXiv:1810.04805 [cs.CL], available online at https://arxiv.org/abs/1810.04805 (2019).

At step/operation 703, after generating the initially-optimized parameter values for the trainable parameters of the attention-based text encoder machine learning model, the predictive data analysis computing entity 106 uses the resulting attention-based text encoder machine learning model to generate, for each training input document data object, a per-document classification loss model for the training input document data object. The per-document classification loss model for a training input document data object may describe a computed measure of deviation between an inferred document classification for the training input document data object and a ground-truth document classification for the training input document data object, where the inferred document classification for the training input document data object may be determined by a document classification machine learning model based at least in part on embedded representations of the training input document data object as generated by an attention-based text encoder machine learning model. In some embodiments, generating the per-document classification loss model for a training input document data object that is associated with n words comprises: (i) generating, using an attention-based text encoder machine learning model (e.g., an attention-based text encoder machine learning model resulting from a first model training stage characterized by a language modeling training task), n word-wise embedded representations for the n words of the training input document data object, (ii) processing the n word-wise embedded representations for the n words of the training input document data object using a document classification machine learning model to generate an inferred document classification for the training input document data object (e.g., an inferred document classification score having a value between 0 and 1, where the magnitude of the inferred document classification scores describes an inferred likelihood that the training input document data object is associated with an affirmative class), and (iii) generating a measure of deviation between the inferred document classification for the training input document data object and a ground-truth document classification for the training input document data object.

For example, consider an exemplary embodiment in which a training input document data object is associated with an inferred document classification score of 0.5 and a ground-truth document classification score of 1.0 (e.g., indicating that the training input document data object is related to a rare disease). In some of the noted embodiments, the per-document classification loss model for the training input document data object may be |1.0−0.5|=0.5. As another example, consider an exemplary embodiment in which a training input document data object is associated with an inferred document classification score of 0.5 and a ground-truth document classification score of 0.0 (e.g., indicating that the training input document data object is not related to a rare disease). In some of the noted embodiments, the per-document classification loss model for the training input document data object may be |0.0−0.5|=0.5.

At step/operation 704, the predictive data analysis computing entity 106 generates a document classification loss model (e.g., a document classification loss function, such as a cross-entropy loss function) based at least in part on (e.g., by aggregating) the per-document classification loss models for the training input document data objects. In some embodiments, the document classification loss model is a cross-entropy loss measure. In some embodiments, if the multi-task training routine of the process 700 employs a batch gradient descent technique, then the per-document classification loss models for a batch of training input document data objects are aggregated to generate a document classification loss model. In some embodiments, if the multi-task training routine of the process 700 employs a stochastic gradient descent technique, then the per-document classification loss model a single training input document data objects is used to generate a document classification loss model.

In some embodiments, the document classification loss model may describe an objective function that relates an inferred document classification determined based at least in part on word-wise embedded representations for training input document data objects to trainable parameters of an attention-based text encoder machine learning model. In some embodiments, because the inferred document classification is determined based at least in part on word-wise embedded representations that are generated by an attention-based text encoder machine learning model, and because the attention-based text encoder machine learning model generates the word-wise embedded representations based at least in part on the trainable parameters of the attention-based text encoder machine learning model, different combinations of the trainable parameter values can lead to different inferred document classifications, and thus the document classification loss model can be optimized (e.g., minimized) to at least partially update/train the parameters of the attention-based text encoder machine learning model.

At step/operation 705, the predictive data analysis computing entity 106 generates one or more subsequently-optimized parameter values for the one or more trainable parameters of the attention-based text encoder machine learning model based at least in part on a sequential learning loss model (e.g., a sequential learning loss function) that is determined based at least in part on the document classification loss model. In some embodiments, the predictive data analysis computing entity 106 generates the subsequently-optimized parameter values by updating values of the trainable parameters of the attention-based text encoder machine learning model to optimize (e.g., minimize) a sequential learning loss model (e.g., a sequential learning loss function) that is determined based at least in part on the document classification loss model.

In some embodiments, a sequential learning loss model may be a loss model (i.e., a loss function) that is determined based at least in part on the loss models for training tasks associated with post-initial model training stages of a multi-task training routine. For example, when a multi-task training routine is associated with a first model training stage characterized by a language modeling training task and a second model training stage characterized by a document classification training task, the sequential learning loss model for the multi-task training routine may be determined based at least in part on the document classification training task. In some embodiments, when a multi-task training routine is associated with a first model training stage characterized by an initial training task and a second model training stage characterized by a subsequent training task, the sequential learning loss model may be determined by adjusting the subsequent loss model associated with the subsequent training task using a sequential learning regularization factor that describes computed effects of potential updates to the initially-optimized parameter values of the attention-based encoder machine learning model on the initial loss model associated with the initial training task. For example, when a multi-task training routine is associated with a first model training stage characterized by a language modeling training task and a second model training stage characterized by a document classification training task, the sequential learning loss model may be determined by adjusting the document classification loss model associated with the document classification training task using a sequential learning regularization factor that describes computed effects of potential updates to the initially-optimized parameter values of the attention-based encoder machine learning model on the language modeling loss model associated with the language modeling training task.

In some embodiments, adjusting the subsequent loss model associated with the subsequent training task using a sequential learning regularization factor that describes computed effects of potential updates to the initially-optimized parameter values of the attention-based encoder machine learning model on the initial loss model associated with the initial training task comprises performing operations corresponding to one or more continuous adaptive learning techniques that are configured to reduce the performance gap across supervised or unsupervised tasks introduced by task specific models. Exemplary continuous adaptive learning techniques are described in Arumae et al., *CALM: Continuous Adaptive Learning for Language Modeling*, arXiv:2004.03794 [cs.CL], available online at https://arxiv.org/pdf/2004.03794.pdf (2020).

In some embodiments, when a multi-task training routine is associated with a first model training stage characterized by an initial training task and a second model training stage characterized by a subsequent training task, the sequential learning regularization factor is determined based at least in part on, for each trainable parameter: (i) a per-parameter update magnitude measure that is determined based at least in part on the initially-optimized parameter value for the particular trainable parameter and a potential parameter value for the trainable parameter, and (ii) a differentiation measure for the initial loss model associated with the initial training task with respect to the trainable parameter. For example, when a multi-task training routine is associated with a first model training stage characterized by a language modeling training task and a second model training stage characterized by a document classification training task, the sequential learning regularization factor may be determined based at least in part on, for each trainable parameter: (i) a per-parameter update magnitude measure that is determined based at least in part on the initially-optimized parameter value for the particular trainable parameter and a potential parameter value for the trainable parameter, and (ii) a differentiation measure for the language modeling loss model with respect to the trainable parameter.

In some embodiments, when a multi-task training routine is associated with a first model training stage characterized by an initial training task and a second model training stage characterized by a subsequent training task, the sequential learning loss model may be determined based at least in part on the output of the equation $L(\theta)=L_B(\theta)+\Sigma_i \lambda F_{i,i}(\theta_i-\theta_i^*)$, where $L$ is the sequential learning loss model, $L_B$ is the subsequent loss model associated with the subsequent training task, $\Sigma_i \lambda F_{i,i}(\theta_i-\theta_i^*)$ is the sequential learning regularization factor, $\theta$ is the set of current parameter values for the set of trainable parameters of the attention-based text encoder machine learning model that are being updated during the second model training stage, $\theta^*$ is the set of initially-optimized parameter values for the set of trainable parameters of the attention-based text encoder machine learning model that resulted from the completion of the first training stage, $i$ is an index variable that iterates over the set of trainable parameters of the attention-based text encoder machine learning model, $\theta_i$ is the current parameter value for the ith trainable parameter of the attention-based text encoder machine learning model that is being updated during the second model training stage, $\theta_i^*$ is the initially-optimized parameter value for the ith trainable parameter of the attention-based text encoder machine learning model that resulted from the completion of the first training stage, $\theta_i-\theta_i^*$ is the per-parameter update magnitude measure for the ith trainable parameter of the attention-based text encoder machine learning model, $\lambda$ is a predefined regularization coefficient, and F is an adaptive learning measure for the ith trainable parameter of the attention-based text encoder machine learning model that is generated using the equation $$F_{i,i} = \frac{1}{N}\sum_{j=1}^{N}\left(\frac{\partial L_A^{(j)}}{\partial \theta_i}\right)^2.$$

In this equation, j is an index variable that iterates over N training input document data objects, $L_A$ is the initial loss model for the initial training task, $\theta_i$ is the current parameter value for the ith trainable parameter of the attention-based text encoder machine learning model that is being updated during the second model training stage, $L_A^{(j)}$ is the initial loss model with respect to the jth training input document data objects, and $$\frac{\partial L_A^{(j)}}{\partial \theta_i}$$

is the differential measure for the initial loss model with respect to the ith trainable parameter of the attention-based text encoder machine learning model.

For example, when a multi-task training routine is associated with a first model training stage characterized by a language modeling training task and a second model training stage characterized by a document classification training task, the sequential learning loss model may be determined based at least in part on the output of the equation $L(\theta)=L_B(\theta)+\Sigma_i \lambda F_{i,i}(\theta_i-\theta_i^*)$, where L is the sequential learning loss model, $L_B$ is the document classification loss model associated with the document classification training task, $\Sigma_i \lambda F_{i,i}(\theta_i-\theta_i^*)$ is the sequential learning regularization factor, $\theta$ is the set of current parameter values for the set of trainable parameters of the attention-based text encoder machine learning model that are being updated during the second model training stage, $\theta^*$ is the set of initially-optimized parameter values for the set of trainable parameters of the attention-based text encoder machine learning model that resulted from the completion of the first training stage, i is an index variable that iterates over the set of trainable parameters of the attention-based text encoder machine learning model, $\theta_i$ is the current parameter value for the ith trainable parameter of the attention-based text encoder machine learning model that is being updated during the second model training stage, $\theta_i^*$ is the initially-optimized parameter value for the ith trainable parameter of the attention-based text encoder machine learning model that resulted from the completion of the first training stage, $\theta_i-\theta_i^*$ is the per-parameter update magnitude measure for the ith trainable parameter of the attention-based text encoder machine learning, $\lambda$ is a predefined regularization coefficient, and F is an adaptive learning measure for the ith trainable parameter of the attention-based text encoder machine learning model that is generated using the equation $$F_{i,i} = \frac{1}{N}\sum_{j=1}^{N}\left(\frac{\partial L_A^{(j)}}{\partial \theta_i}\right)^2.$$

In this equation, j is an index variable that iterates over N training input document data objects, $L_A$ is the language modeling loss model for the language modeling training task, $\theta_i$ is the current parameter value for the ith trainable parameter of the attention-based text encoder machine learning model that is being updated during the second model training stage, $L_A^{(j)}$ is the language modeling loss model with respect to the jth training input document data objects, and $$\frac{\partial L_A^{(j)}}{\partial \theta_i}$$

is the differential measure for the language modeling loss model with respect to the ith trainable parameter of the attention-based text encoder machine learning model.

Accordingly, by using various embodiments of the present invention, an attention-based text encoder machine learning model may be sequentially trained to generate semantically meaningful embedded representations (e.g., word-wise embedded representations) for input document data objects using first training objectives defined in accordance with language modeling tasks and then second training objectives defined in accordance with document classifications. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

D. Word Mover's Similarity (WMS) Techniques

FIG. 8 is a flowchart diagram of an example process 800 for generating a cross-document similarity measure for an unlabeled document data object and a label document data object based at least in part on a word-embedded representation set for the unlabeled document data object and a word-embedded representation set for the label document data object. However, while various embodiments of the present invention described use WMS techniques described in relation to the process 800 to generate a cross-document similarity measure for an unlabeled document data object and a label document data object, a person of ordinary skill in the relevant technology will recognize that the disclosed WMS techniques described in relation to the process 800 can be performed to generate a cross-document similarity measure for any document pair comprising a first document data object and a second document data object based at least in part on a word-embedded representation set for the first document data object and a word-embedded representation set for the second document data object. Moreover, while various embodiments of the process 800 are described as being performed by the predictive data analysis computing entity 106, a person of ordinary skill in the relevant technology will recognize that the process 800 may be performed by any combination of one or more computing entities.

As depicted in FIG. 8, the process 800 begins at step/operation 801 when the predictive data analysis computing entity 106 identifies an unlabeled document word-wise embedded representation for each unlabeled document word of one or more unlabeled document words of the unlabeled document data object. An unlabeled document word is a word in an unlabeled document data object. An unlabeled document word-wise embedded representation may be a data object that describes a feature-describing numeric representation of an unlabeled document word in the particular unlabeled document data object. For example, an unlabeled document word-wise embedded representation for a corresponding unlabeled document word may include a representation of the corresponding unlabeled document word that is generated by a trained attention-based text encoder machine learning model.

At step/operation 802, the predictive data analysis computing entity 106 determines a label document word-wise embedded representation for each label document word of one or more label document words of the particular label document data object. A label document word is a word in a label document data object. A label document word-wise embedded representation may be a data object that describes a feature-describing numeric representation of a label document word in the particular label document data object. For example, a label document word-wise embedded representation for a corresponding label document word may include a representation of the corresponding label document word that is generated by a trained attention-based text encoder machine learning model.

At step/operation 803, the predictive data analysis computing entity 106 determines, for each word pair that includes a corresponding unlabeled document word of the one or more unlabeled document words and a corresponding label document word of the one or more label document words, a pairwise word similarity measure of the unlabeled document word-wise embedded representation for the corresponding unlabeled document word that is associated with the word pair and the label document word-wise embedded representation for the corresponding label document word that is associated with the word pair. The pairwise word similarity measure between a pair of words may describe a measure of deviation of the word-wise embedded representations of the pair of words. In some embodiments, each pairwise word similarity measure for a word pair of the plurality of word pairs is determined based at least in part on a cosine distance of the word-wise embedded representation for the corresponding unlabeled document word associated with the word pair and the word-wise embedded representation for the corresponding label document word associated with the word pair.

The pairwise word similarity measure between a pair of words may describe a feature-based measure of similarity of the pair of words. For example, the pairwise word similarity measure between a pair of words may describe a measure of cosine similarity of the embedded vector representations of the two words. In some embodiments, to determine the pairwise word similarity measure for a word pair that includes a corresponding unlabeled document word of the one or more unlabeled document words and a corresponding label document word of the one or more label document words, the predictive data analysis computing entity 106 may determine a measure of cosine similarity distance of the unlabeled document word-wise embedded representation for the corresponding unlabeled document word that is associated with the word pair and the label document word-wise embedded representation for the corresponding label document word in an unlabeled document that is associated with the word pair.

At step/operation 804, the predictive data analysis computing entity 106 determines, for each word pair of the plurality of word pairs, a pairwise flow indicator based at least in part on the pairwise word similarity measure of the word pair relative to other pairwise word similarity measures in a subset of the plurality of word pairs that is associated with the corresponding unlabeled document word for the word pair. For example, the pairwise flow indicator for a word pair that includes a corresponding unlabeled document word of the one or more unlabeled document words and a corresponding label document word of the one or more label document words may describe a binary value that indicates whether the corresponding label document word is the most related word for the corresponding unlabeled document word according to the pairwise word similarity measures associated with the corresponding unlabeled document word.

In some embodiments, each pairwise flow indicator for a word pair of the plurality of word pairs is determined based at least in part on maximizing a Word Mover's Distance (WMD) measure of the word pair. A WMD measure may be a data object that describes, for each complete set of edges that together connect all of the first document words of a first document in a corresponding document pair and all of the second document words of a second document in a corresponding document pair, a sum of the similarity values of each pair of words weighed by their corresponding flow indicator in the complete set of edges.

Returning to FIG. 8, at step/operation 805, the predictive data analysis computing entity 106 determines the cross-document similarity measure for the document pair based at least in part on each pairwise word similarity measure for a word pair of the plurality of word pairs as well as each pairwise flow indicator for a word pair of the plurality of word pairs. In some embodiments, to determine the cross-document similarity measure for the document pair, the predictive data analysis computing entity 106 applies the pairwise flow indicator for each word pair to the pairwise word similarity measure for the word pair to determine a pairwise relationship measure for the word pair and combines the pairwise relationship measures of all word pairs in order to determine the cross-document similarity measure. In some embodiments, because non-affirmative pairwise flow indicators have a zero value, combining pairwise relationship measures determined by applying pairwise flow indicators to pairwise word similarity measures has the effect of combining pairwise word similarity measures of word pairs whose pairwise flow indicators indicates an affirmative pairwise flow value (e.g., pairwise word similarity measures of word pairs with corresponding edges in a selected complete set of edges that maximizes the WMD measure for the document pair).

In some embodiments, determining the cross-document similarity measure sim(d,g) for a document d and a document g is performed in accordance with the steps/operations of the below equation:

Equation 1

$$S^*_{dg} = sim(d, g) = \max_{\{t_{(i,j)}\}} \sum_{(i=1)}^{\{m\}} \sum_{(j=1)}^{\{n\}} t_{(i,j)} s_{(i,j)} \quad \text{[Constraint C1]}$$

Subject to: $\sum_{(j=1)}^{(n)} t_{(i,j)} = f_i, \forall\ i.$ $\sum_{(i=1)}^{(m)} t_{(i,j)} = f_j, \forall\ j$ [Constraint C2]

$t_{(i,j)} \geq 0, \forall\ i, j$ [Constraint C3]

In Equation 1, i is an index variable that iterates over the m words of the document u, j is an index variable that iterates over the n words of the document $\ell$, $t_{i,j}$ is the pairwise flow indicator for a word the ith word of the document u and the jth word of the document $\ell$ where the matrix T=[$t_{\{i,j\}}$], 1≤j≤n, 1≤i≤m, $s_{i,j}$ is the pairwise word similarity measure for a word the ith word of the document u and the jth word of the document $\ell$, and $f_i$ is frequency word i defined as the ratio of Term-Frequency-Inverse-Domain Frequency (TF-IDF) the word i and the sum of the TF-IDF of words appearing in the set of label document data objects. In a relaxed version of the problem, Equation 1 is modified and one of the constraints C1 or C2 is removed; however, constraint C3 is maintained. An important property of S* as determined in accordance with Equation 1 is that its value is between (0, 1]. Moreover, in some embodiments, an optimal solution is defined as $T^* \in R^{m \times n}$ where $t_{ij}^* = f_i$ if $\text{argmax}_q(i, q)$, i=1, 2, . . . , m and $t_{ij}^* = 0$ otherwise.

For example, in an exemplary embodiment of FIG. 9, given the unlabeled document data object 911 and the label document data object 912 (here associated with an issue category), the predictive data analysis computing entity 106: (i) generates the set of pairwise word similarity measures 921 for the unlabeled document data object 911 and the label document data object 912, (ii) generates the set of frequency measures 922 for the unlabeled document data object 911 and the label document data object 912, and (iii) generates the cross-document similarity measure of 0.9 for the unlabeled document data object 911 and the label document data object 912 using the Word Mover Similarity (WMS) calculation 931.

Accordingly, as described above, by using various embodiments of the present invention, an attention-based text encoder machine learning model may be trained in accordance with multi-task training routine to generate semantically meaningful embedded representations (e.g., word-wise embedded representations) for input document data objects using different training objectives defined in accordance with different training tasks. The resulting embedded representations are then configured to provide more semantically rich inputs features for downstream natural language processing machine learning models, which in turn reduces the number of training samples needed to train the noted downstream natural language processing machine learning models before they reach a desired level of accuracy. In this way, by reducing both the number of training samples needed to train the noted downstream natural language processing machine learning models and consequently the number of training iterations needed to train the noted downstream natural language processing machine learning models before they reach a desired level of accuracy, various embodiments of the present invention improve storage-wise efficiency and computational efficiency of training the noted downstream natural language processing machine learning models and reduce the amount of the storage resources and processing resources needed to train the noted downstream natural language processing machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, using one or more processors and an attention-based text encoder machine learning model, and based at least in part on an unlabeled document data object, an unlabeled document word-wise embedded representation set for the unlabeled document data object, wherein the attention-based text encoder machine learning model is: (i) configured to generate a word-wise embedded representation set for an input document data object, and (ii) is generated by:
    identifying one or more training input document data objects respectively associated with one or more ground-truth label classifications,
    generating, during a first model training stage, one or more initially-optimized parameter values for one or more trainable parameters of the attention-based text encoder machine learning model using a language modeling loss that is defined in accordance with one or more first training objectives for satisfying a text reconstruction sub-task based at least in part on the one or more training input document data objects,
    generating, using the attention-based text encoder machine learning model, a training word-wise embedded representation set for a training input document data object of the one or more training input document data objects,
    generating, using a document classification machine learning model and based at least in part on the training word-wise embedded representation set for the training input document data object, an inferred document classification for the training input document data object,
    generating based at least in part on the inferred document classification for the training input document data object and a ground-truth document classification for the training input document data object a document classification loss, comprising a cross-entropy loss, for the one or more training input document data objects, wherein the document classification machine learning model is trained by optimizing the document classification loss, and
    generating, during a second model training stage, one or more subsequently-optimized parameter values for the attention-based text encoder machine learning model using a sequential learning loss comprising the document classification loss modified in accordance with a sequential learning regularization factor that describes computed effects of a plurality of update options to the one or more initially-optimized parameter values, wherein the sequential learning regularization factor is determined based at least in part on: (i) a per-parameter update magnitude measure that is determined based at least in part on an initially-optimized parameter value for a particular trainable parameter and a potential parameter value for the particular trainable parameter, and (ii) a differentiation measure for the language modeling loss with respect to the particular trainable parameter; and generating, using the one or more processors and the document classification machine learning model and based at least in part on the unlabeled document word-wise embedded representation set, a document classification.

2. The computer-implemented method of claim 1, wherein the text reconstruction sub-task comprises a word masking language modeling sub-task or a next sentence prediction sub-task.

3. The computer-implemented method of claim 1, wherein the attention-based text encoder machine learning model comprises a bidirectional encoder representations from transformers machine learning model.

4. A computing system comprising one or more processors and memory including program code, the memory and the program code configured to, with the one or more processors, cause the computing system to at least:

generate, using an attention-based text encoder machine learning model and based at least in part on an unlabeled document data object, an unlabeled document word-wise embedded representation set for the unlabeled document data object, wherein the attention-based text encoder machine learning model is: (i) configured to generate a word-wise embedded representation set for an input document data object, and (ii) is generated by:

identifying one or more training input document data objects respectively associated with one or more ground-truth label classifications, generating, during a first model training stage, one or more initially-optimized parameter values for one or more trainable parameters of the attention-based text encoder machine learning model using a language modeling loss that is defined in accordance with one or more first training objectives for satisfying a text reconstruction sub-task based at least in part on the one or more training input document data objects, generating, using the attention-based text encoder machine learning model, a training word-wise embedded representation set for a training input document data object of the one or more training input document data objects, generating, using a document classification machine learning model and based at least in part on the training word-wise embedded representation set for the training input document data object, an inferred document classification for the training input document data object, generating based at least in part on the inferred document classification for the training input document data object and a ground-truth document classification for the training input document data object, a document classification loss, comprising a cross-entropy loss, for the one or more training input document data objects, wherein the document classification machine learning model is trained by optimizing the document classification loss, and generating, during a second model training stage, one or more subsequently-optimized parameter values for the attention-based text encoder machine learning model using a sequential learning loss comprising the document classification loss modified in accordance with a sequential learning regularization factor that describes computed effects of a plurality of update options to the one or more initially-optimized parameter values, wherein the sequential learning regularization factor is determined based at least in part on: (i) a per-parameter update magnitude measure that is determined based at least in part on an initially-optimized parameter value for a particular trainable parameter and a potential parameter value for the particular trainable parameter, and (ii) a differentiation measure for the language modeling loss with respect to the particular trainable parameter; and generate, using the document classification machine learning model and based at least in part on the unlabeled document word-wise embedded representation set, a document classification.

5. The computing system of claim 4, wherein the text reconstruction sub-task comprises a word masking language modeling sub-task or a next sentence prediction sub-task.

6. The computing system of claim 4, wherein the attention-based text encoder machine learning model comprises a bidirectional encoder representations from transformers machine learning model.

7. A computer program product comprising at least one non-transitory computer-readable storage medium having computer-readable program code portions stored therein, the computer-readable program code portions configured to:

generate, using an attention-based text encoder machine learning model and based at least in part on an unlabeled document data object, an unlabeled document word-wise embedded representation set for the unlabeled document data object, wherein the attention-based text encoder machine learning model is: (i) configured to generate a word-wise embedded representation set for an input document data object, and (ii) is generated by:

identifying one or more training input document data objects respectively associated with one or more ground-truth label classifications, generating, during a first model training stage, one or more initially-optimized parameter values for one or more trainable parameters of the attention-based text encoder machine learning model using a language modeling loss that is defined in accordance with one or more first training objectives for satisfying a text reconstruction sub-task based at least in part on the one or more training input document data objects, generating, using the attention-based text encoder machine learning model, a training word-wise embedded representation set for a training input document data object of the one or more training input document data objects, generating, using a document classification machine learning model and based at least in part on the training word-wise embedded representation set for the training input document data object, an inferred document classification for the training input document data object, generating based at least in part on the inferred document classification for the training input document data object and a ground-truth document classification for the training input document data object, a document classification loss, comprising a cross-entropy loss, for the one or more training input document data objects, wherein the document classification machine learning model is trained by optimizing the document classification loss, and generating, during a second model training stage, one or more subsequently-optimized parameter values for the attention-based text encoder machine learning model using a sequential learning loss comprising the document classification loss modified in accordance with a sequential learning regularization factor that describes computed effects of a plurality of update options to the one or more initially-optimized parameter values, wherein the sequential learning regularization factor is determined based at least in part on: (i) a per-parameter update magnitude measure that is determined based at least in part on an initially-optimized parameter value for a particular trainable parameter and a potential parameter value for the particular trainable parameter, and (ii) a differentiation measure for the language modeling loss with respect to the particular trainable parameter; and generate, using the document classification machine learning model and based at least in part on the unlabeled document word-wise embedded representation set, a document classification.

8. The computer program product of claim 7, wherein the attention-based text encoder machine learning model comprises a bidirectional encoder representations from transformers machine learning model.

9. The computer program product of claim 7, wherein the text reconstruction sub-task comprises a word masking language modeling sub-task or a next sentence prediction sub-task.

* * * * *